United States Patent
Barker et al.

(10) Patent No.: US 9,344,176 B2
(45) Date of Patent: May 17, 2016

(54) METHOD AND APPARATUS FOR PROVIDING ELEVATION PLANE SPATIAL BEAMFORMING

(75) Inventors: David Edwin Barker, Stockport (GB); David Sam Piazza, San Jose, CA (US)

(73) Assignee: Quintel Technology Limited, Bristol (GB)

(*) Notice: Subject to any disclaimer, the term of this patent is extended or adjusted under 35 U.S.C. 154(b) by 114 days.

(21) Appl. No.: 13/589,121

(22) Filed: Aug. 18, 2012

(65) Prior Publication Data
US 2013/0044650 A1    Feb. 21, 2013

Related U.S. Application Data

(60) Provisional application No. 61/525,625, filed on Aug. 19, 2011.

(51) Int. Cl.

| | |
|---|---|
| H04B 7/005 | (2006.01) |
| H04B 7/06 | (2006.01) |
| H04B 7/10 | (2006.01) |
| H04W 16/28 | (2009.01) |
| H01Q 3/26 | (2006.01) |
| H04B 7/04 | (2006.01) |

(52) U.S. Cl.
CPC ............ *H04B 7/0617* (2013.01); *H01Q 3/2605* (2013.01); *H04B 7/0408* (2013.01); *H04B 7/0469* (2013.01); *H04B 7/0671* (2013.01); *H04B 7/10* (2013.01); *H04W 16/28* (2013.01)

(58) Field of Classification Search
CPC G06F 11/1658; H04B 1/0057; H04B 7/0413; H04B 7/0617; H04B 7/0697; H04B 7/08; H03H 7/463; H03H 9/725; H03H 11/344; H03H 9/706; H04W 16/28; H04W 72/0453; H04L 5/16
USPC ......... 370/278; 455/562.1; 342/372; 343/853
See application file for complete search history.

(56) References Cited

U.S. PATENT DOCUMENTS

| | | | |
|---|---|---|---|
| 5,222,246 A | 6/1993 | Wolkstein | |
| 5,714,961 A | 2/1998 | Kot et al. | |
| 5,757,866 A | 5/1998 | Kannari et al. | |
| 5,771,017 A | 6/1998 | Dean et al. | |
| 5,924,020 A * | 7/1999 | Forssen et al. | 455/129 |
| 6,232,921 B1 * | 5/2001 | Aiken et al. | 342/383 |
| 6,351,237 B1 | 2/2002 | Martek et al. | |
| 6,483,478 B2 | 11/2002 | Yu et al. | |
| 8,604,989 B1 * | 12/2013 | Olsen | 343/754 |
| 2002/0191565 A1 | 12/2002 | Mani et al. | |
| 2006/0087385 A1 | 4/2006 | Fitzpatrick et al. | |
| 2010/0144289 A1 | 6/2010 | Haskell et al. | |
| 2011/0103504 A1 | 5/2011 | Ma | |
| 2011/0194650 A1 | 8/2011 | Lee et al. | |

OTHER PUBLICATIONS

International Search Report and Written Opinion for PCT/US12/51514, Nov. 21, 2012, 12 pages.
Office Action received in corresponding European Application No. 12-825400, dated Jul. 23, 2015, pp. 1-12.

* cited by examiner

*Primary Examiner* — Alpus H Hsu
*Assistant Examiner* — Elton Williams

(57) ABSTRACT

In one embodiment, the present disclosure provides a method and apparatus for spatially filtering inter-cell co-channel interference in the elevation plane, which in turn will improve network spectral efficiency.

17 Claims, 8 Drawing Sheets

US 9,344,176 B2

METHOD AND APPARATUS FOR PROVIDING ELEVATION PLANE SPATIAL BEAMFORMING

RELATED APPLICATIONS

This application claims priority under 35 U.S.C. §119(e) to U.S. provisional patent application Ser. No. 61/525,625 filed on Aug. 19, 2011, which is hereby incorporated by reference in its entirety.

The present disclosure relates generally to elevation plane spatial beamforming and, more particularly, to a method and apparatus for spatially filtering inter-cell co-channel interference in the elevation plane, which in turn will improve network spectral efficiency.

SUMMARY

In one embodiment, the present disclosure provides a method and apparatus for spatially filtering inter-cell co-channel interference in the elevation plane, which in turn will improve network spectral efficiency. For example, in one embodiment, a base station system comprises a first passive radio frequency (RF) antenna assembly comprising a beamforming network having at least two ports, for creating a spatially coherent main beam with a variable elevation plane beam tilt in response to differentially phased signals or differentially amplitude signals across the two ports, a RF to baseband down conversion stage coupled to the first passive RF antenna assembly, for processing the differentially phased signals or differentially amplitude weighted signals into baseband signals and a receiver combining stage for performing a vector summation on the baseband signals.

In another embodiment, a base station system comprises a precoding stage for mapping of baseband data symbols associated with a mobile terminal into two baseband signal branches and pre-coding the branches via a multiplication of the signal branches with complex pre-coding weights to impart a phase difference between the two signal branches for generating pre-coded signals, an allocation stage for allocating resources to the pre-coded signals, a modulation stage for modulating the pre-coded signals into modulated signals, a baseband to RF up-conversion stage for up-converting the modulated signals into RF signals, and a first passive RF antenna assembly comprising a beamforming network having at least two ports for receiving the RF signals, and for creating a spatially coherent main beam with a variable elevation plane beam tilt in response to differentially phased signals across the two ports.

In another embodiment, a method comprises creating a spatially coherent main beam with a variable elevation plane beam tilt in response to differentially phased signals or differentially amplitude signals across two ports of a beamforming network of a first passive RF antenna assembly, processing the differentially phased signals or differentially amplitude weighted signals into baseband signals via a RF to baseband down conversion stage coupled to the first passive RF antenna assembly, and performing a vector summation on the baseband signals via a receiver combining stage.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
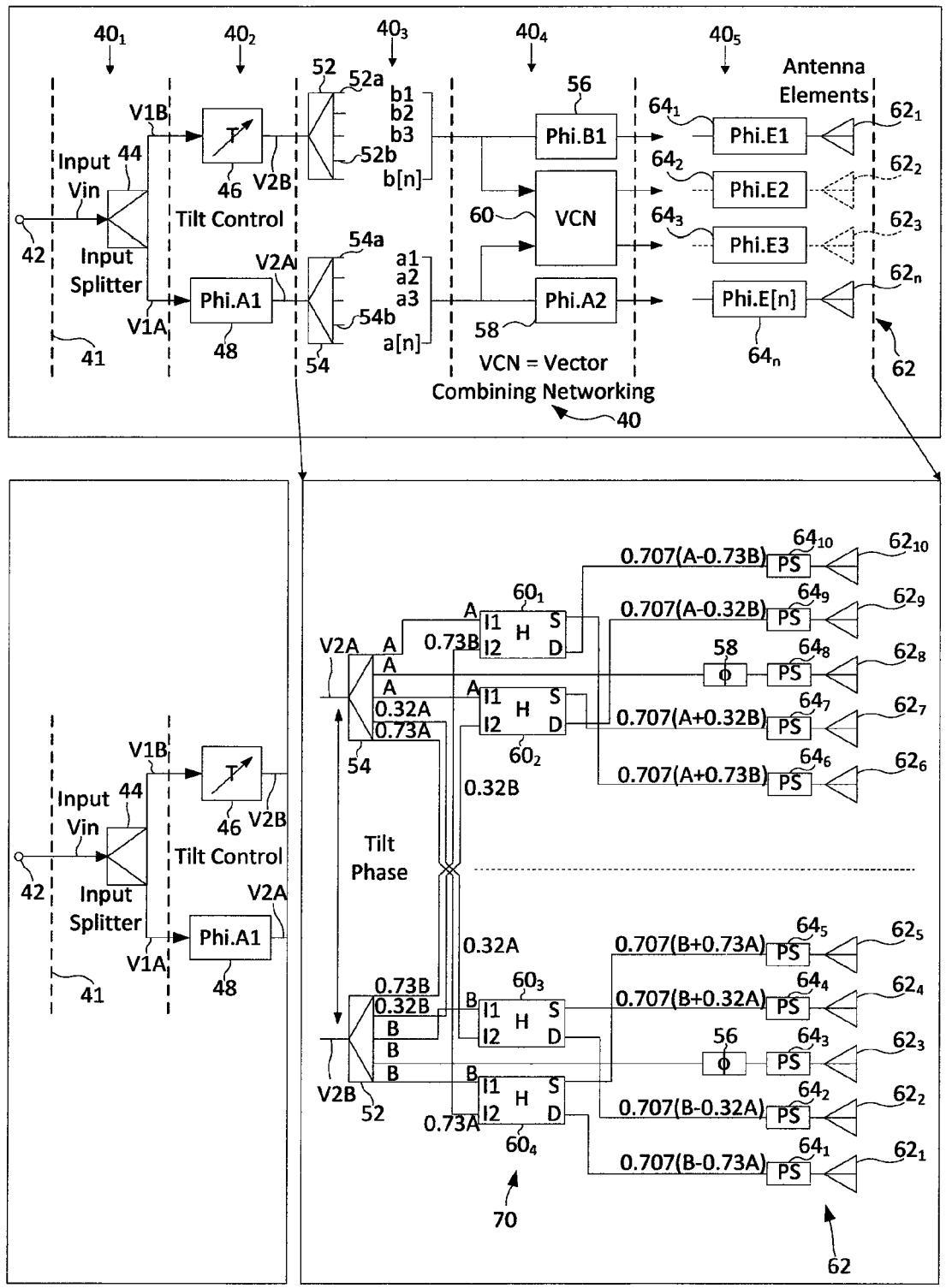
FIG. 1 depicts an Antenna Beamforming network and Array of Antenna elements which can create beam with variable tilt; where tilt angle is a function of the phase difference applied across the Beamformer ports.
Figure 2:
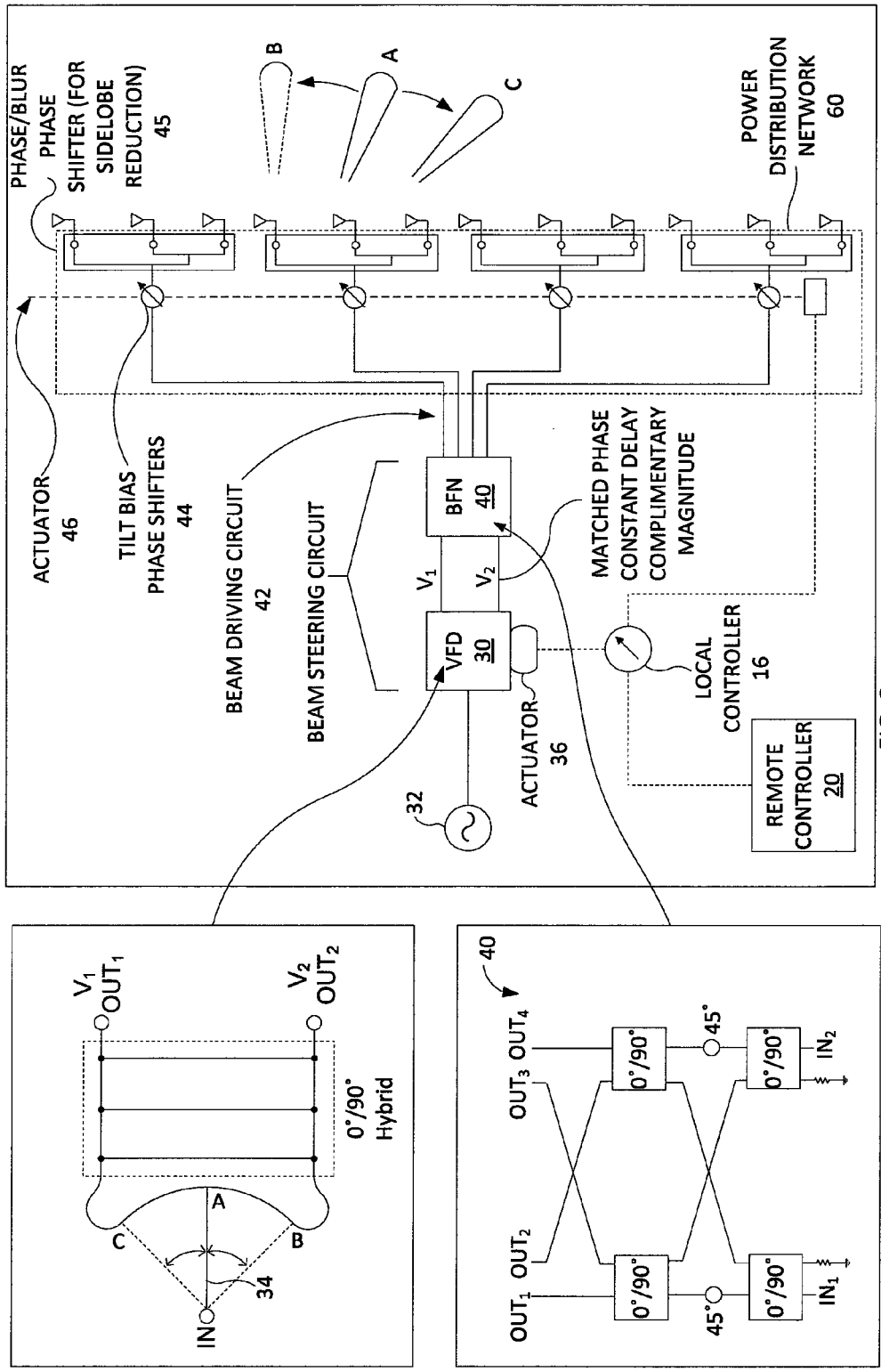
FIG. 2 depicts an Antenna Beamforming network and Array of Antenna elements which can create beam with variable tilt; where tilt angle is a function of the amplitude difference applied across the Beamformer ports.

The present disclosure relates generally to elevation plane spatial beamforming and, more particularly, to a method and apparatus for spatially filtering inter-cell co-channel interference in the elevation plane, which in turn will improve network spectral efficiency.

Multiple Antenna techniques for use with radio communication systems encompass a broad range of applications, and antenna configurations. It is beyond the scope of this introduction to discuss fully what these are, but suffice to say they can be broadly divided into three types of application; Diversity, Spatial Multiplexing Beamforming, and Spatial Beamforming.

Antenna Diversity is a technique that can be employed in the cellular industry, and is employed in various legacy cellular networks in the form of Receiver Diversity at the base station to provide an effective diversity gain for Uplink channels. With technologies such as UMTS/HSPA+, Transmit Diversity can also be applied at the base station for Downlink channels. Additionally, mobile terminals (e.g., cell phones, smart phones, tablets, and the like) equipped with two or more antennas can also deliver Transmit Diversity for the Uplink, and benefit from Receive Diversity on the Downlink. Combinations of Receive Diversity and Transmit Diversity are also possible in a communications link. Diversity aims to improve link robustness against multi-path fading radio channels, which in turn can be translated to a link gain which is beneficial for improving cellular network coverage, or indeed be translated to a gain in throughput/capacity. Diversity is achieved by exploiting de-correlated or partially correlated multi-path radio channels between transmitter (Tx) antenna and each receiver antenna (Rx) in the case of Receiver Diversity; the same applies for Transmit Diversity. Multi-path de-correlation can be achieved by using sufficient spatial separation and/or exploiting orthogonal polarizations of two or more antennas. Sufficient spatial separation for de-correlation is a function of the angular dispersion of the radio channel as observed by the antenna arrangement, which is a function of the relative positions of the radio channel scatterers with respect to the antennas. At a macro cellular base station end of a link, which may be well elevated above the scattering environment, a sufficient distance may be of the order of up to 40λ, whereas sufficient distance between antennas at a terminal end may be less than λ/2; this is because multi-path tends to arrive from all angles to/from a mobile terminal, which is typically surrounded by scatterers, whereas at a base station antenna, Radio Frequency (RF) energy to/from one mobile terminal tends to arrive within a finite range of angles.

For receiver diversity, each signal received is combined to maximize some metric, such as Signal to Noise Ratio (SNR). A popular combining technique is that of Maximal Ratio Combining (MRC), where each signal is co-phased and then weighted according to its instantaneous SNR and then summed together, in effect a vector summing process. The combining function usually occurring at complex baseband after down-conversion, and where multiple MRC processes may be running concurrently for all active communications link in a multiple access communications system. MRC can be shown to work as an optimal combining scheme in Noise Limited radio channels.

In the case of interference limited radio channels, other combining schemes such as Interference Rejection Combining (IRC) can be used in Multiple Access cellular system in Uplink at the base station, especially for intra-cell interference rejection. IRC in this case aims to find complex weights which maximally suppress or even cancel any co-channel intra-cell interference from the wanted signal, and naturally assumes that the radio channels by which the interference is transmitted can be known, which would be the case for a base station attempting to reject intra-cell interference. IRC schemes can be shown to be sensitive to noise and hybrid schemes and those based upon Minimum Mean Square Error (MMSE) processing are often used for stability reasons in noise, but often all such receive combining schemes are generally referred to MRC due to historical reasons.

Transmit Diversity exploits independent or partially independent radio channels in a similar manner to Receive Diversity. For radio access systems based upon Time Division Duplex (TDD), it is possible to use the same co-phasing and weight coefficients derived from Receive Diversity for Transmit, Diversity, assuming that the radio channel can be measured (via pilot or reference symbols) at a rate equal to or greater than the coherence bandwidth of the radio channel. In this case Transmit Diversity is called pre-coding, where information symbols are pre-coded (multiplied by complex weights to adjust amplitude and phase) prior to transmission via the Transmit Diversity antennas. This is also often termed pre-coder based Beamforming. However, with Frequency Division Duplex (FDD) radio access systems which use different RF spectrum for Uplink and Downlink channels, pre-coder based Beamforming to deliver Transmit diversity is not realistically possible unless a fast and large overhead in reverse link signaling could be tolerated; for example, for the Uplink to inform the base station of the instantaneous channel received on Downlink, so the base station can pre-code data for Transmission. Transmit Diversity for FDD systems often used Space Time Block Coding (STBC) or Space Frequency Block Coding (SFBC) techniques as an alternative more practical means. Here, pairs of consecutive information symbols are transmitted from a first antenna and at the same time the same symbols, but sign-reversed and complex conjugated are transmitted from a second antenna, at a base station. At the terminal receiver (using a single antenna), the terminal receives two consecutive symbols, where each received symbol is a vector composite of the transmitted symbols. Given that the radio channel is known (via the Terminal measuring periodic Downlink Pilot symbols and the radio channel doesn't de-correlate between Downlink radio channel estimation intervals), and the Transmit Diversity scheme is known, the original transmit symbols can be fully recovered using simultaneous complex equations, which is in fact multiplication of the received symbols by the channel inverse matrix.

N×M Spatial Multiplexing Beamforming is often termed N×M MIMO (Multiple In-Multiple Out) meaning the technique relies upon N multiple antennas at the Transmission end and M multiple antennas at the Receiving end of a communications link. For completeness, Receiver Diversity is often termed SIMO for Single In-Multiple Out, and Transmit Diversity termed MISO for Multiple In-Single Out. Strictly speaking MISO and SIMO operating together is just combinations of Transmit and Receive Diversity, and can also be called MIMO too, but this arrangement is not performing Spatial Multiplexing. Spatial Multiplexing Beamforming (normally just called Spatial Multiplexing) aims to increase spectral efficiency, rather than signal quality or robustness, by transmission and reception of multiple information streams or layers, each using the same frequency and time resources, but where orthogonality is attempted in the spatial dimension. Spatial Multiplexing, as with Diversity, relies upon and exploits de-correlated or partially correlated multi-path radio channels between each transmit (Tx) antenna and each Receive (Rx) antenna; this correlation typically denoted mathematically by a radio channel complex Matrix to capture all Tx antenna to Rx antenna radio channel combinations. De-correlation can be achieved by using sufficient spatial separation and/or exploiting orthogonal polarizations of the multiple antennas within each end of the communications link, in the same manner as for Diversity. Spatial Multiplexing theory can demonstrate that it is possible to increase spectral efficiency by re-using the same time and frequency resources for transmission of separate information between Tx and Rx ends of a communications link up to K times, with K antennas at each end of the link, and $K^2$ de-correlated radio channels. One way of considering a 2×2 Spatial Multiplexing channel is to realize that two signals transmitted are two signals creating interference to one another; the two signals received by the receive antennas can then carry out IRC to suppress the other signal thus resulting in two orthogonal information streams. Another way of viewing this process is applying an inverse of the complex radio channel matrix to the received signals to arrive at the wanted signals. As aforementioned with IRC, even if there is good radio channel de-correlation, if signals experience high levels of noise, i.e., poor SNR then Spatial Multiplexing may not be reliable. Spatial Multiplexing however in practice, such as in LTE systems is achieved not by simply applying a channel inverse at the receiver, but by pre-coding signals for transmission and de-coding signals at reception, where the pre-coding and de-coding together are performing the channel inverse function. This pre-coding arrangement allows for better performance through improved signal isolation at the receiver side. Pre-coded Spatial Multiplexing also allows for combinations of pre-coded Beamforming and Spatial Multiplexing in the event full radio channel matrix de-correlation cannot be achieved. As discussed above for Transmit Diversity, with FDD systems and considering the Downlink channel case, ideal pre-coding would require full, rapid and persistent feedback of the Downlink radio channels. However, this would require a large overhead in terms of Uplink signaling, and instead for systems such as LTE, the Terminal reports back to the base station key parameters such as signal quality, how de-correlated the Downlink radio channels are and then the base station can decide upon a pre-coding matrix to use from a finite set of pre-coding matrices with which to pre-code the information symbols; and informing the Terminal which pre-coding matrix is being used for the current time interval. This is called codebook based Spatial Multiplexing or codebook based Beamforming (i.e., Beamforming for Spatial Multiplexing). Additionally LTE allows for the Terminal to suggest a pre-coding matrix from the known codebook for the base station to use. This partial channel information feedback and codebook based pre-coding constraint allows for practical spatial multiplexing.

Spatial Multiplexing and Diversity rely upon de-correlated radio channels, whereas classical Spatial Beamforming is a technique which exploits highly correlated radio channels, where multiple antennas normally arranged in a linear array are co-phased in such a manner as to direct energy to/from a particular spatial direction, and/or reject (spatially filter) co-channel interference from (an)other spatial direction(s). Note that Spatial Beamforming, sometimes termed classic Beamforming, Coherent Beamforming, or just Beamforming is different to pre-coder based Beamforming as used with Transmit Diversity and Spatial Multiplexing. Pre-coder based Beamforming can be viewed as the most general interpretation of transmit side Beamforming, where Spatial Beamforming is a particular sub-set. Spatial Beamforming exploits strong radio channel correlation between Tx antenna-Rx antenna radio channels, and as such antennas designed for (Spatial) Beamforming at a macro base station are typically separated by small distances (typically $\lambda/2$), and typically arranged as a classic array of antennas. Beamforming can be applied at the transmitter end or the receiver end of a communications link, or indeed both. Note: when referring to Beamforming, an antenna in the array is commonly called an Antenna element of the Antenna array, but the (antenna) array can also be considered as a single antenna itself. Beamforming is designed to enhance the radio link quality rather than directly increasing channel throughput or robustness, as with Spatial Multiplexing or Diversity, respectively. Beamforming enables different coherent spatial radiation patterns to be formed via control of phase and/or amplitude to each antenna element in the array. Beamforming when used in cellular communication systems can offer improvement in C/I levels which can be translated or indirectly exploited to improving coverage or capacity. As stated above, although Beamforming uses multiple antennas (antenna elements) it is considered as a single antenna in the SIMO, MISO, and MIMO taxonomy. It is therefore also possible to use hybrid combinations of Spatial Multiplexing or Diversity with (Spatial) Beamforming.

Spatial Multiplexing, Diversity and Beamforming are simply classes or descriptors to help understand the application of using multiple antennas. As stated earlier they all, in fact can be considered as Beamforming in the most general sense, since phase and amplitude manipulation and subsequent processing is carried out for each information symbol associated with each antenna. Sometimes, the term Beamforming is used to describe all these multiple antenna techniques. However, when considering for example spatial multiplexing or Diversity where orthogonal polarized antennas are used, then a "beam" in the familiar polar or Cartesian co-ordinates cannot really be visualized or described by a conventional coherent or spatially convergent radiation pattern. In fact when the term Beamforming is used in the context of Spatial Multiplexing or Diversity, it strictly refers to the general class of pre-coder based Beamforming in dispersive radio channels, and could be tangibly viewed as creating very localized coherency of wanted information signals and/or incoherency of unwanted co-channel signals in "vector" space, meaning that wanted RF energy is coherent at a particular location in space, time and frequency, rather than coherency at an angle or direction from the antennas as with more classical Spatial Beamforming. However, for the purposes of this disclosure, the term Beamforming is used, as described in the previous paragraph, to mean "classic" spatially coherent Beamforming using an array of closely coupled antennas (i.e., antenna elements) in an array configuration where a Beam can be fully described in the angular domain, i.e., a radiation pattern using Polar or Cartesian co-ordinates can be used to fully describe Beamforming.

There are many texts on the subject of Spatial Beamforming, but can be classified into two broad classes; switched Beamforming and adaptive Beamforming. With switched beam antennas, such as an antenna array of N antennas (often called antenna elements) fed from an N×N Butler matrix distribution network permits one of N different and spatially orthogonal radiation patterns (beams) to be generated via connection of an RF signal to one of N different input ports of the Butler matrix, considering a Tx mode of operation. As the Butler matrix is a passive distribution network, the reciprocal case for Rx mode can also be made.

Adaptive arrays, also commonly referred to as Smart Antenna arrays rely upon independent RF phase/amplitude variation at each antenna (antenna element), thus allowing a very wide range of possible radiation pattern outcomes. Classic coherent spatial Beamforming theory can demonstrate that given N antenna elements, then N freedoms of Phase/Amplitude control are possible which can be used to create N spatial beams and N−1 spatial nulls in angular terms. Control of Phase/Amplitude at the antenna elements can be achieved using RF Beamforming or Digital Beamforming techniques. RF Beamforming would be typically achieved, considering a Transmission mode, using an RF Power Amplifier (PA) which can vary its amplitude or gain, and an RF phase shifting arrangement, associated with each antenna element. For Reception to the antenna, then the use of a variable gain Low Noise Amplifier (LNA) and phase shifting arrangement associated with each antenna element is required. A trivial example of an RF Beamforming technique is a conventional cellular base station antenna utilizing Variable Electrical Tilt methods; in this case, a variable phase shifter is used at each antenna element in an array (or often a phase shifter driving pairs of elements) with the goal of varying main beam elevation pattern tilt angle. However, a modulated cellular RF signal from and to a base station carries multiple embedded information signals at the same time, separated in frequency, code domains, or spatial domains (if spatial multiplexing is used) normally associated with different terminals/users which are generally in different spatial locations for example as would be the case in a cellular network. The disadvantage of RF Beamforming, for example in a cellular network is that the all information (to be transmitted or received by different terminals) shares the same, albeit adaptive radiation pattern.

Digital Beamforming however performs RF to baseband conversion or RF translation, then analogue to digital conversion for the RE signal from each antenna element (considering a receive channel). This process results in N×complex baseband signals associated with N×antenna elements. By applying complex weights to each of these complex baseband signals, it can be shown that this varies phase/amplitude in the RF domain at the actual antenna elements. The advantage of digital Beamforming removes the need for RF phase/amplitude control at the antenna elements, instead allowing use of fixed gain and fixed phase delays associated with the antenna elements. Moreover, multiple copies of the baseband signal can be created and processed independently and concurrently. This permits independent Beamforming for individual users/terminals which may be in different spatial locations or more precisely at different bearings or directions to/from the antenna array in a cellular network. In effect multiple, concurrent beams can be generated for different users, with each beam carrying specific information/data for each user/terminal.

For the Downlink channel in LTE cellular systems, Transmit Diversity, Spatial Multiplexing MIMO and Spatial Beamforming are all possible, and are achieved by applying complex weights to information symbols at complex baseband, in what is called the pre-coder. The pre-coder is, as aforementioned the most general term to describe the baseband processing of coding associated with all incarnations of Beamforming. For Diversity and Spatial Multiplexing the pre-coding is designed to be used with antennas with low multipath radio channel correlation. With more classic Beamforming, the pre-coder is designed to be used with antennas with high multi-path radio channel correlation. With Spatial Multiplexing the pre-coding weights change at a rate commensurate with the multi-path channel fading rate, whereas classic Beamforming, the pre-coder weights would change at a much slower rate commensurate with a terminal having moved significantly across a cell. Finally, for FDD LTE systems, Spatial Multiplexing is based upon codebook based pre-coding whereas Spatial Beamforming can be based upon non codebook pre-coding, i.e., arbitrary pre-coding vectors can be used.

In cellular communications systems and in particular access technologies such as 3GPP LTE permit a variety of multiple antenna configurations to exploit Spatial Multiplexing, Antenna Diversity and Beamforming. For example, a LTE cellular application can use 4× passive antenna arrays connected to what is commonly referred to as a 4T4R base station, i.e., having 4× duplexed Tx/Rx ports, assuming Frequency Division Duplex (FDD) operation. This base station could connect to 4× co-polarized antennas which have sufficiently large separation between antennas to ensure radio channel (branch) de-correlation between Tx antennas and Rx antennas; this would permit 4-branch antenna diversity or up 4 parallel layers of Spatial Multiplexing (assuming 4 antennas at the terminal). The disadvantage of this configuration is that it requires four antenna positions, per sector at a base station site.

A more practical arrangement to achieve 4-branch antenna diversity would be to use two Cross-polarized antennas which have sufficient separation between them. This arrangement reduces the number of physical antenna positions, per sector at a base station site to two. With this arrangement or the 4× co-polarized antenna arrangement, it is still possible that many radio channel matrices may not exhibit full de-correlation and hence non-optimal Spatial Multiplexing MIMO.

If the use of two antenna positions is prohibitive and/or the Tx antenna-Rx antenna radio channel matrix is not de-correlated sufficiently to sustain 4-branch diversity or 4 parallel spatial multiplexing then the 4T4R base station can be connected to 4× linearly co-polarized antennas with inter antenna distances of ~$\lambda$/2 or 2× cross polarized arrays where inter co-polar antenna distances are ~$\lambda$/2, and as such result in coherent Spatial Beamforming. These configurations permit a single, albeit slightly larger, antenna position to be used at a base station site. The latter configuration may be considered more advantageous since this permits polarization diversity (for 2-branch Antenna diversity or the possibility for 2×2 Spatial Multiplexing MIMO) plus coherent Beamforming function, i.e., across two co-polarized antennas. In LTE, this is often referred to as "Dual Layer Beamforming"; that is two spatially multiplexed data layers with Spatial Beamforming within each layer, and is specified in 3GPP LTE Release 9 specifications for Downlink (Base Station Transmission).

In cellular systems such as LTE, Spatial Beamforming is exemplified as azimuth plane Beamforming. This uses multiple passive antennas or antenna arrays arranged in a horizontal side-by-side formation. Each passive antenna array consists of a column of multiple antenna elements with ~$\lambda$/2 spacing aligned in the vertical plane connected to an RF distribution network with a fixed radiation pattern; each passive array here is a simple static Beamformer, with perhaps only a variable tilt function (semi-static) imposing phase delays at the individual antenna elements of the array. The Adaptive Beamforming (function) is applied across the passive antenna arrays, thus having adaptive Beamforming in the Azimuth plane and non-adaptive static or semi-static beam in the Elevation plane. The passive antenna arrays need to have a side-by-side separation distance of <$\lambda$ to ensure coherence in spatial radiation pattern Beamforming in Azimuth.

The above example describes a 4T4R base station connected to 4× antennas, and similar logic can be applied to a 2T4R base station. In a 2T4R base station, 2× duplexed Tx/Rx channels plus 2× Rx only channels are available. This would allow the Uplink or receive channel to exploit up to 4 parallel Spatial Multiplexing layers (assuming 4× antennas at the terminal), or 4-branch Diversity, or Beamforming, or a combination as discussed. The Downlink or transmit channel however could only exploit two branches. The advantage of using a 2T4R base station, over a more conventional 2T2R base station is that only two PAs are required, with only the additional costs of two extra receivers, which are considerably less expensive than PAs. Moreover, it is often the Uplink channel which is the limiting link in a cellular network, more often being power limited, and therefore by having additional performance gains for Uplink channels through additional receivers and processing is beneficial. In low dispersion radio channels, and using a single antenna position with closely spaced cross-polar arrays provides 2.5-3 dB of Uplink gain over the more conventional 1T2R or 2T2R base station case and only a 1 dB less diversity combining gain than had the two cross-polar antennas been separated by 1 meter. A disadvantage of using two closely spaced cross-polar antennas is that many antenna systems demanded by cellular operators need to be multi-band capable. The closely spaced side-by-side array arrangement as described above achieves a single antenna position but the array topology does not lend itself to also incorporating additional antenna arrays designed for different spectrum bands. For example, a typical operator may wish for a low-band array (say 790-960 MHz) and a high-band array (say 1710-2170 MHz) in a dual-band antenna. Given the approximate 2:1 ratio between the bands this can be achieved by having dual band antenna elements placed in a vertical array plus single band (high-band only) antenna elements placed between the dual-band antenna elements. This is a common dual-banding technique known in the industry, which maximizes space, antenna beam tracking and squint metrics for both bands due to mechanical and electrical symmetry along the array face. If two side-by-side arrays, say at high band are used to support a 2T4R or 4T4R base station then it is difficult to fabricate three side-by-side arrays as High/Low/High and maintain performance and minimum form factor.

A base station may use a 4-branch MRC process to perform optimal combining of the four receive branches at complex baseband. MRC is one of a number of diversity combining techniques, where individual receive branches are multiplied by complex weights to vary amplitude and phase. MRC by definition combines and co-phases receive branches (performing a vector sum at baseband), associated with a terminal/specific uplink channel, where each receive branch is weighted by a factor proportional to the square root of the SNR of that branch. Noise is assumed to be de-correlated between branches. When the two cross-polar antennas are side-by-side, then the radio channel experienced by each pair of co-polarized antennas is virtually the same at the base station (i.e., highly correlated), and the MRC process can be considered as performing a simple coherent and adaptive Beamforming function in Azimuth for each of the two orthogonal polarizations in the Uplink channel.

Additionally, it should be noted that Diversity combining, including MRC implementations can take many forms, as discussed earlier. MRC in its strictest definition performs optimal combining in a noise limited radio channel. When co-channel interference is also correlated then MRC can also be combined with interference rejection algorithms such as IRC, and MMSE algorithms. It is beyond the scope of this patent application to detail all receive combining algorithms. However it should be carefully noted that MRC can be implemented in the receiver pre-detection or in the receiver post-detection stages. In post-detection implementations of MRC, phase information from each receive branch is lost, since the MRC system is designed to track the envelope of a multipath fading signal on each branch, using this as the basis for combining, and hence the MRC process is simply applying weights then combining. In pre-detection MRC implementations, phase information is preserved and hence performing co-phasing, weighting and combining, i.e. performing a vector summation.

Uplink Beamforming in the Azimuth plane with Polarization diversity using a 4-branch receiver diversity combining process with conventional base station antenna arrays can be done by configuring two passive cross-polar antenna arrays in a side-by-side arrangement, as discussed. However, it is not readily possible to create Uplink Beamforming in the same manner for the Elevation plane using a 4-branch diversity combining process. One might consider the case of arranging two cross-polar passive antenna arrays in the vertical plane (where one passive antenna array is placed on top of the other passive antenna array). However, for practical directivity gains for a cellular base station antenna, a passive base station antenna array may consist of many vertically stacked antenna elements, typically 5-14 elements, depending upon the spectrum band of operation and desired directivity and vertical elevation pattern beamwidth. Therefore, using two passive arrays vertically separated will result in the phase centers of each passive array being multiple wavelengths apart, and thus would result in a non-coherent Beamforming operation, and as such only vertical space diversity could be achieved. Also, it is understood that vertical space diversity techniques invariably lead to branch imbalance between the two cross-polar antenna arrays due to the fact the higher antenna array has a more favorable radio propagation channel to/from mobile terminals; branch imbalance results in sub-optimal diversity combining.

Given the cellular tessellation geometry of cells in a cellular network, and for certain radio access technologies, Elevation Beamforming may be more advantageous than Azimuthal Beamforming in terms of resulting network performance benefits. Many cellular access technologies, such as CDMA, WCDMA/UMTS/HSPA+, LTE/LTE-Advanced, WiMax, and even GSM/GPRS/EDGE with aggressive fractional frequency hopping can use aggressive spectral re-use between sectors of the same cell site, and between cell sites. It should be noted that full spectral re-use is employed resulting in a 1:1 re-use factor, and that the network can be considered as interference limited rather than noise limited. Given the cell tessellation geometry of a cellular network in Azimuth and Elevation planes co-channel inter-cell site interference in a Macro cellular network would tend to consistently come from a narrow range of elevation angles around the horizon, assuming a reasonably flat plane with which the cellular network operates. For systems such as WCDMA, interference can be considered from both intra-cell interference and inter-cell interference, the former being a function of the channel dispersion. However, in LTE and GSM based systems, it can be shown that interference is predominately inter-cell interference. Also, for LTE and GSM systems Co-channel Uplink interference in the Azimuth plane may be much more variable as a function of azimuth angle, dependent upon where adjacent cell sites and respective served mobile terminals are positioned relative to a base station. When using two cross-polar passive antenna arrays in a side-by-side arrangement as described previously with a 4-branch receive combining process then this essentially has two adaptive Beamforming freedoms per orthogonal polarization. With two freedoms of Beamforming it is only possible to Beamform in Azimuth, creating an Azimuthal radiation pattern with up to two main-lobes but only one null. If co-channel interference in a cellular network comes from multiple azimuthal directions then Azimuthal Beamforming to suppress interference in this manner may not be optimal. An optimal Beamformer in Azimuth may need to create multiple nulls, which requires additional Beamforming freedoms and hence additional antenna arrays and a higher-order receiver branch combining process. This becomes prohibitive (due to larger total antenna array aperture size), and the fact most base stations are not readily equipped with beyond 4-branch receive combining processes.

One means of achieving a per-terminal orientated adaptive Beamforming or adaptive tilting function in the elevation plane from a vertically aligned antenna array is the use of a fully active antenna. In an active antenna it is possible to have control of phase and amplitude at complex baseband for each active user (Uplink and/or Downlink) at each antenna element in the array. This of course requires a PA, LNA, Duplexer arrangement, Up/Down conversion at each antenna element. For practical directivity gains for a cellular base station antenna, this may consist of many elements, typically 5-14 elements, depending upon the spectrum band of operation and desired directivity and resulting vertical elevation pattern beamwidth. The disadvantage of an active array is that multiple active electronics must be employed together with high-order branch receive combining (Uplink Beamforming) algorithms to impart the required Beamforming. However, active antennas using high-order Beamforming may be very well suited for highly dispersive radio channels where the angle of arrival of multi-path components may extend over a wide range of angles, such as may be typical of micro-cellular environments where multi-path scatterers are relatively close to and surround (in Azimuth and Elevation terms) the antenna.

A base station antenna array arrangement may comprise the use of an antenna distribution network suitable for use in a cellular communications network. The distribution network can drive (in transmit mode) or be driven from (in receive mode) a plurality of antenna elements which forms a coherent main beam in the elevation plane suitable for cellular applications; the distribution network or vector network combiner is fed (transmit)/feeds (receive) from/to a differentially phased signal input/output, where the angle of main beam elevation radiation pattern tilt is a function of the phase difference of the differential signal.

A base station antenna array arrangement may also use a Butler Matrix for use in a cellular communications network. The distribution network (Butler Network) can drive (in transmit mode) a plurality of antenna elements which forms a main beam radiation pattern in the elevation plane suitable for cellular applications; the distribution network is fed (transmit) from a signal pair which is a differential or complimentary power signal, connected to two ports of a 4×4 Butler network which would form orthogonal spatial beams if driven in isolation. Furthermore, phase to power conversion can be achieved through the use of a simple hybrid combiner connected to the complimentary power input pair, and thus achieve a mainbeam variable tilt operation in response to the phase difference of the input signal to the Hybrid combiner.

Similarly, a phase to power conversion operation could also be achieved by the use of a Hybrid combiner connected to the differential phase input ports of the antenna distribution networks, in order to vary a mainbeam in elevation (tilt) as a function of the power ratio signal input to the Hybrid combiner.

In one embodiment, the objective of the current invention is to deliver an adaptive spatially coherent Beamforming function in the elevation plane, at a "per terminal or per user resolution" using a completely passive antenna array connected to a simple base station MRC or similar receive combining process for the Uplink channels. The present invention also discloses the same arrangement for use with Downlink channels to deliver adaptive elevation spatial Beamforming using a simple 2-branch (2-freedom) Beamforming algorithm, which adapts phase difference or power difference between the 2 branches.

In particular, the present invention discloses the use of passive antenna arrays which employ passive distribution networks which are designed to vary mainbeam radiation elevation pattern (tilt) as a function of differential power (power ratio) and/or differential phase at the input ports to the antenna distribution network (transmit mode), or at the output from the antenna distribution network (when considering a receive mode).

By connecting such antenna distribution network or antenna Beamforming network schemes to a base station using 4-branch receive diversity combining (such as 4-branch MRC) or generically a 4-branch receive Beamformer algorithm, it is possible to achieve per user or per terminal uplink Beamforming or tilting operation for two orthogonally polarized antenna arrays. One embodiment of the current invention depicts a 4-branch base station receiver connected to a Cross-Polar antenna array, where each antenna array uses the differential phase (or power) processing method. The choice of whether to use an antenna system capable of variable tilt in response to differential phase or power may be dependent upon what particular Uplink diversity combining, Uplink Beamforming algorithm and Downlink Beamforming algorithm (if any) is used in the base station. If a 4-branch Receive diversity scheme is available as would be the case for a 2T4R or 4T4R base station, which employs a pre-detection MRC implementation then to enable Uplink Beamforming, either antenna Beamforming network method (phase or power processing) may be used since the MRC will be able to process phase and amplitude for each active uplink channel at complex baseband. On the other hand, if post-detection MRC is employed and hence the MRC scheme is designed for envelope tracking, and as such phase information is lost prior to MRC combining, an antenna Beamforming network based on processing differential power may be more appropriate.

In one embodiment, the combining process at the receiver can take many forms such as the popular process of MRC. This combining process effectively performs a vector sum of the receive signals (branches) at complex baseband (i.e., after down-conversion and de-modulation from RF); the vector sum is carried out in such a manner as to weight each receive signal in accordance to the instantaneous signal quality or signal strength, and to also apply phase delay (co-phasing action) to each complex weighted receive signal branch such that coherent combining can be achieved. Known reference signals from the transmitter are transmitted at known and periodic intervals; this allows the receiver to perform a radio "channel estimation" to which signal strength, signal quality measurements of the receive signals can be taken including measurements of phase differences between the receive signals, which in turn are used for determining the required complex weights in the combining process. This receive combining process can be applied to multiple and simultaneous radio links at the base station, by taking multiple copies of the complex baseband receive signals and processing as described above independently for each active independent mobile terminal to base station radio Uplink.

For Downlink Elevation Spatial Beamforming, it is expected that generating differential phase between information signals which are then power amplified may be a more suitable arrangement than generating power differences between information signals. Therefore, an antenna beamformer distribution network method which can vary tilt in response to differential phase is preferred. The reason why Downlink Beamforming may be more advantageous using differential phasing is simply the fact that a differential power scheme may require large swings in available power, and in the limit (assuming all information signals are Beamformed to one tilt angle) demand full power from one PA and no power from the other; this clearly requiring larger power PAs, or headroom in the PAs. It is also anticipated in the current invention that phase and power processing methods be also used for the basis of Elevation Beamforming for different duplex links, e.g., the differential power method for the Uplink Elevation Beamforming and differential Phase for the Downlink Beamforming. For example, another embodiment of the current invention takes a Tx/Rx line and an Rx only line (e.g., two of the four lines from a 2T4R base station) and connects these to the two inputs of a 180° Hybrid combiner; the two outputs of the 180° Hybrid combiner being then connected to an antenna system driving an array of antenna elements where the elevation pattern tilt angle is a function of the phase difference. In this particular embodiment, the single Tx line is split with equal power and phase via the Hybrid combiner and thus drives the antenna beamformer network creating a directive radiation beam in elevation with a certain angle of Downlink tilt. A variable RF phase shifter can also be inserted on one of the outputs of the Hybrid combiner and before connection to one of the two ports of the antenna beamforming network to enable a variable downlink tilt function. Now considering the Receive side of this embodiment, the differential phase antenna beamformer will receive information on the Uplink from a terminal and this Uplink receive signal will emerge as a pair of signals with a differential phasing at the ports of the beamforming network, depending upon the angle of arrival incident upon the array. As these receive signals pass through the 180° Hybrid Combiner in receive mode, any phase difference in the Uplink receive signals is translated into a complementary power difference, which can then be processed by a base station using a pre or post detection MRC diversity combining, or similar scheme.

Various embodiments are depicted depending upon whether the base station is capable of processing phase difference or power difference for the information signals carried on the Uplink and Downlink channels. The motivation for the present invention exploits the fact that users in a cell tend to occupy different distances from the cell site (cell centre) up to the cell boundary; by being able to direct a spatial elevation pattern at/from each active terminal then this reduces the required Uplink power a terminal needs to communicate back to a base station. A reduction in Uplink powers means reduced inter-cell co-channel interference, which in turn permits improved C/I geometry across the cellular network. Moreover, inter-cell co-channel interference in an LTE network for example tends to arrive (considering the Uplink channel) from a narrow range of elevation angles at around, or just below the horizon. Since a tilt per terminal action is being created with the current invention, the elevation pattern being directed to/from a particular user is also receiving less inter-cell interference by virtue of the elevation pattern being, on average tilted down with respect to a more conventional static elevation pattern. In an extreme case, perhaps with a base station using a receiver combining algorithm based on minimum C/I such as IRC or MMSE with 4-branches could result in the elevation radiation pattern first upper null being effectively directed toward the adjacent cell(s) to maximize C/I statistics. Given the elevation geometry in a macro cell site where co-channel interference dominates from typically one bearing (near to the Horizon) and a wanted Uplink signal is at another bearing (consider the per terminal case), then an antenna array beamformer with only 2-freedoms may be sufficient, i.e., the beamformer has control of phase and/or amplitude for only two inputs thus only able to control the bearing of N−1 nulls (i.e., 1 null). This achieves spatial filtering (in angular space) of inter-cell interference in the elevation plane.

Another viewpoint by which the current invention can be considered is angle diversity or pattern diversity in the Uplink. Consider a 4×4 Butler matrix network where the 4× outputs connect to 8× antenna elements in element pairs, arranged in the vertical plane as a column. Two of the four inputs of the Butler matrix are terminated, and the remaining two input ports of the Butler matrix are associated with adjacent orthogonal beams. If power is applied to one of the non-terminated ports and no power to the other non-terminated port, a beam is generated in a particular direction in elevation; if the power is swapped over then an orthogonal beam in generated in a different direction; if power is varied between the two ports then a composite beam of varying elevation tilt (direction) is produced. Likewise, in receive mode for the Uplink channel, the reciprocal will occur; if a plane wave is incident upon the array then power emerges from the two ports of the Butler matrix, and emerges as a power ratio depending upon the angle of incidence. The advantage of a Butler matrix is that two orthogonal beams can co-exist with full array length gain from the same physical array and also be isolated from one another. A similar argument can be constructed for the antenna beamforming methods based on the vector combining of differentially phased signals, when a Hybrid combiner is connected directly to the beamformer ports to convert phase differential to power differential. By considering these two orthogonal beam in the elevation plane as receive diversity path with an MRC process, then because the MRC process applies different complex weights prior to summing the receive then this in effect can be viewed as an adaptive Uplink tilt action (tilting between the two orthogonal beams) with the property of the elevation pattern having one strong null and one directive beam. It is fully expected that cells where there may be a high concentration of traffic close to the cell centre may find most benefit from the current invention. In such a scenario, one might visualize that a significant proportion of traffic is communicating predominately via the orthogonal beam with greatest tilt (and greatest nulling or rejection to adjacent cells in the elevation plane).

The current invention may also be most appropriate in macro-cellular environments, where the base station antenna is at a height generally greater than the surrounding rooftops or multi-path scatterers. As stated earlier, macro cell sites tend to experience low angular Multi-Path dispersion or angular spread in elevation terms. The angular dispersion in elevation is also expected to decrease with increasing distance from the cell centre, assuming a similar scattering volume or environment is maintained around the terminal. In the limit, the angular dispersion of multipath arriving at or near to the horizon angle is expected to be relatively narrow; this is likely to be the dominated by any co-channel interference from adjacent and distant cells. The presence of an elevation pattern null around these angles is beneficial to suppress such inter-cell interference.

Whilst the above description focuses upon adaptive antenna Beamforming for the Uplink channel in a cellular communications system, similar benefits and arguments can be made for adaptive Spatial Beamforming on the Downlink channel too, when 4× transmit ports are available from a base station, commonly known as 4× Tx/Rx or 4T4R. Cellular access technologies such as HSPA+ and LTE can support various antenna configurations from a 4T4R base station. For example, two closely spaced cross-polar antennas connected to a 4T4R base station may deliver Uplink and Downlink adaptive Beamforming in Azimuth plus 2-way (de-correlated) receiver diversity for Uplink, and 2-way transmission diversity or 2×2 Spatial Multiplexing for Downlink.

The embodiments of the present invention consider a mobile terminal T1 which would be located near to the ground and typically surrounded by local scatterers in the radio channel communicates via the Uplink communications channel to the base station via antenna assembly (100). It is assumed that the base station antenna is sufficiently elevated above the local buildings and hence elevated above the scattering environment and as such we can assume that the RF signal from T1 arrives at the base station antenna (100) via scattering which subtends a relatively narrow range of elevation angles, and we make the assumption that this angular dispersion is typically similar to, or less than the vertical beamwidth of the antenna array. The radio channel geometry of the radio link is illustrated in FIG. 3.

Figure 3:
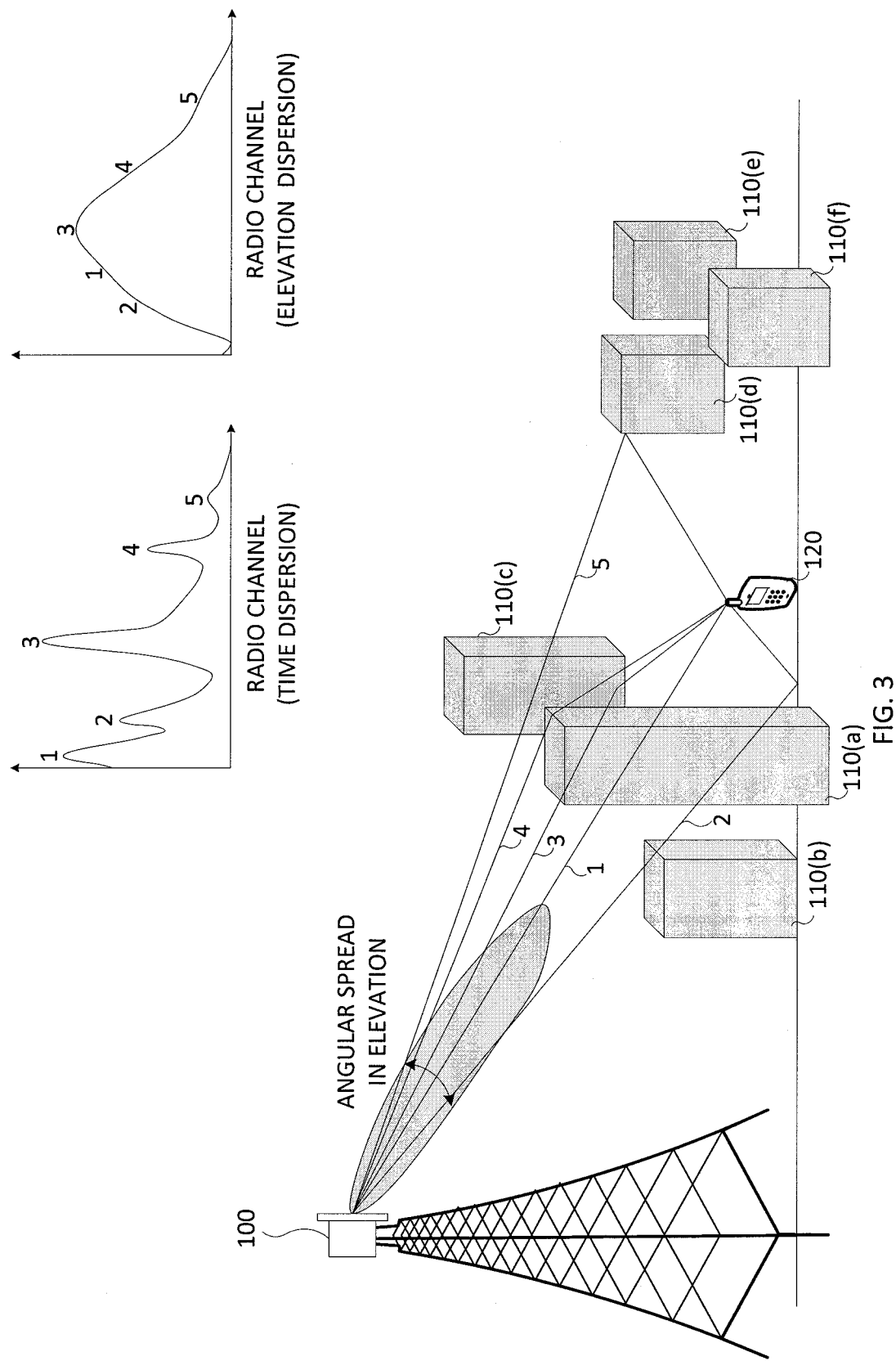
FIG. 3 depicts a Radio Channel Multi-path Geometry assumed for various embodiments.

FIG. 3 illustrates the multi-path radio channel in elevation terms. Multi-path dispersion exists in both Azimuth and Elevation planes, and therefore FIG. 3 depicts the resolved multi-path components in elevation only for the purposes of this discussion. Five dominant multi-path components are shown 1-5. Multi-path component 1 represents a direct path, although not a line of sight component, it travels through one building 110(a) of a plurality of buildings 110(a)-110(f) between base station antenna and terminal. Multi-path component 2 is a similar direct path but includes a ground reflection near to the terminal 120. Multi-path component 3 is the strongest multi-path component and arrives via a reflection from the side of a nearby building 110(c) which is between base station antenna and terminal. Multi-path component 4 is a diffractive path via the rooftop of the tallest building 110(a), and Multi-path component 5 has the largest temporal dispersion via a reflection from another building 110(d), which is not between the base station antenna 100 and terminal $T_1$. All these Multi-path components subtend the beamwidth of the base station antenna 100, and as such it is not possible to combine independent multi-paths (radio channel equalization in the elevation plane) as this would warrant a much larger (longer) and hence impractical base station antenna array to create very narrow beams to resolve each multi-path component.

The temporal dispersion in the radio channel can be equalized using known techniques at the base station, including adaptive channel equalization. For communication links where the information bandwidth is less than the coherence bandwidth of the radio channel, i.e., multi-path delay is much less than the information symbol period then the radio channel is considered narrowband and all multi-path echoes fall comfortably within the symbol period and minimal Inter Symbol Interference (ISI) results; such access technologies might include GSM or LTE when considering most radio environments. When the multi-path delay profile is greater than the symbol duration, the radio channel is considered wideband and then RAKE receiver architectures for example can be employed to equalize the radio channel, as used in access technologies such as CDMA and WCDMA/UMTS.

It should be noted that various embodiments of a base station system are disclosed below. In describing various stages or modules of the base station system, various methods of signal processing will also be described. As such, the steps of these various methods will be described in view of FIGS. 4-8. Thus, the steps of these methods are supported by FIGS. 4-8 as flowcharts for these methods. It should be noted that although only 2T4R base stations are shown, 4T4R base stations are based on similar architecture as discussed above and can be implemented, e.g., where a second parallel base station port connection arrangement is present for connection to a second antenna assembly which may be of an orthogonal polarization to the first antenna assembly and where the receiver diversity combining process has four branches (or even greater than 4 branches) rather than two branches.

4.1 Embodiment 1

Figure 4:
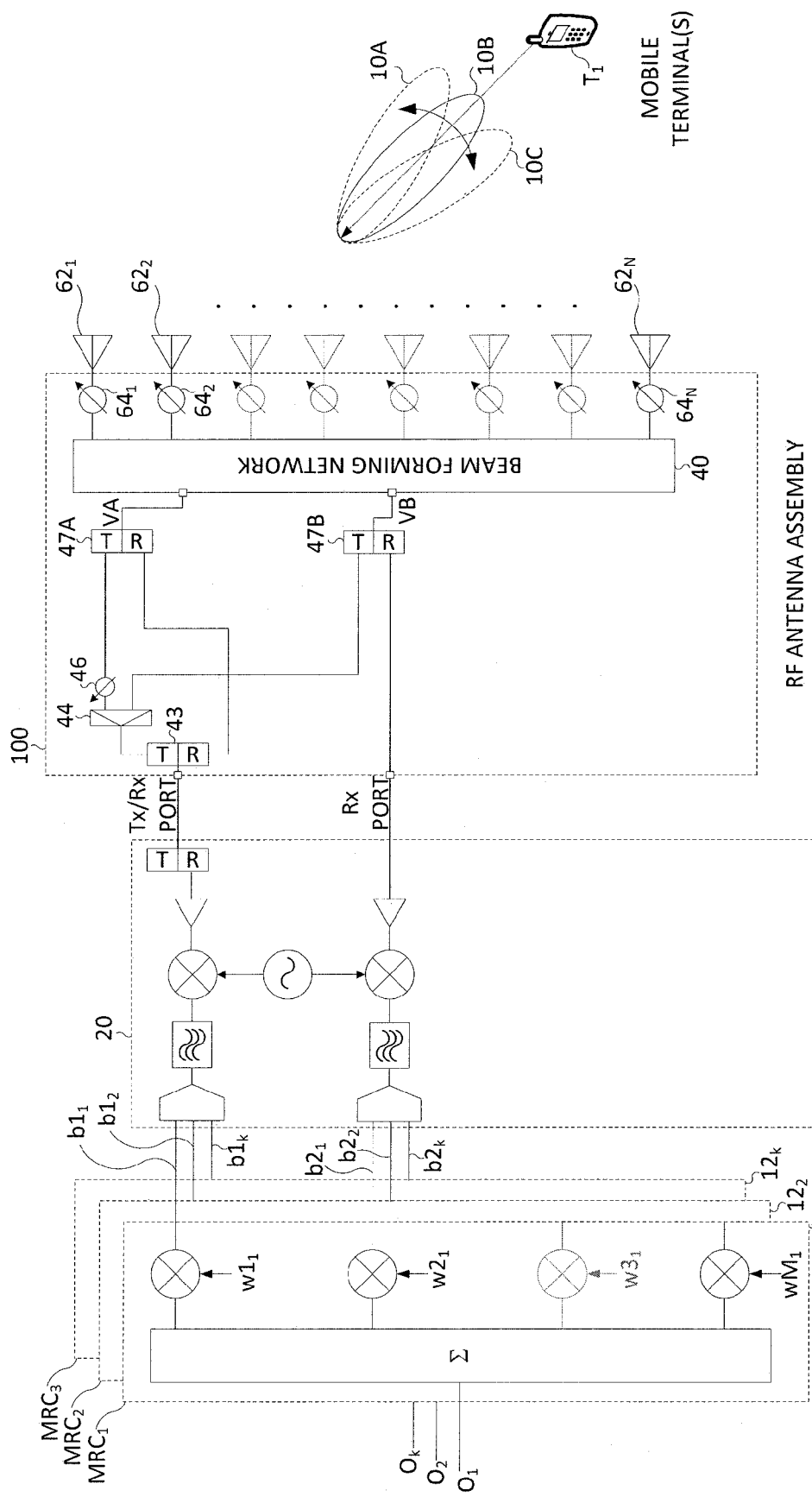
FIG. 4 depicts Uplink Elevation Beamforming using 2T4R base station with MRC receive combining process with a passive antenna array based on variable tilt in response to differential phase across VA & VB Ports.

FIG. 4 depicts Uplink Elevation Beamforming using a 2T4R base station with MRC receive combining process with a passive antenna array based on variable tilt in response to differential phase across VA & VB Ports. A first embodiment of the current invention is illustrated in FIG. 4, using an antenna assembly based upon an adaptive beamforming network (40) designed for processing differential phased signals at the ports of the beamforming network (VA and VB). Such a beamforming network (40) suitable for operation includes those based upon U.S. Pat. No. 7,450,066, U.S. Pat. No. 7,400,296, or U.S. Pat. No. 7,420,507. The RF signal from the mobile terminal T1 arrives at the Base Station Antenna Assembly (100), and according to FIG. 3. The antenna assembly comprises of an antenna array of N antenna elements ($62_1$ to $62_N$) which are typically spaced apart, e.g., by 0.7λ and λ. Each antenna element may be connected to phase shifters as shown ($64_1$-$64_{1N}$), or indeed (although not shown) groups of antenna elements may be connected to phase shifters. The purpose of the phase shifters ($64_1$-$64_{1N}$) is to provide the facility to move the mid-value beam tilt angle of the adaptive beamforming range around. The beamforming range is the range of coherent beams which can be produced over a range of phase differences across the VA and VB ports where the beam maintains some minimum specifications such as directivity, gain, vertical beamwidth, sidelobe levels, etc. This is shown as beam 10A (minimum tilt angle), 10C (maximum tilt angle) and 10B (mid-tilt angle). Assuming an Uplink channel, the RF energy arriving at the antenna array is processed via the Beamforming Network (40) which results in signals at the ports VA and VB of the Beamforming Network. The signals, associated with terminal T1 at VA and VB will be substantially of equal amplitude, but will have a phase differential between; the phase difference being a function of the angle of arrival in elevation, assuming that the angle of arrival falls within the valid Beamforming range of the Beamforming network. The signals at VA and VB are connected to duplexing filters, 47A and 47B, respectively, which are designed to accommodate a Downlink signal for the antenna array, which will be discussed later in this embodiment. Broadly, the method has created a spatially coherent main beam with a variable elevation plane beam tilt in response to differentially phased signals or differentially amplitude signals across two ports of a beamforming network of a first passive RF antenna assembly.

Considering only the Uplink signals from VA and VB, these are essentially passed directly to the base station; the first processing stage of a base station being the RF to Baseband Down-conversion stages (20). FIG. 4 depicts a simple schematic of an RF to Baseband processing stage for the purposes of this embodiment, but it should be noted that such processing stage can take many other forms. The two differentially phased Uplink signals are down-converted to digital complex baseband; signal VA emerges as $b1_1$ at complex baseband and signal VB emerges as $b2_1$ at complex baseband. Complex baseband signal $b1_1$ for example will comprise of a real and imaginary baseband signal components. Broadly the method processes the differentially phased signals or differentially amplitude weighted signals into baseband signals via a RF to baseband down conversion stage coupled to the first passive RF antenna assembly. Please note: for clarity, FIG. 4 does not depict complex baseband signals with separate real and imaginary signals, instead shown as a single complex signal line. It can be shown that the RF phase difference between VA and VB ports will emerge as a baseband phase shift between $b1_1$ and $b1_2$, according to digital beamforming theory previously discussed. The two complex baseband signals are then processed by a Maximal Ratio Combining (MRC) stage or other similar receive combining process ($12_1$) stage. Broadly, the method performs a vector summation on the baseband signals via a receiver combining stage. The MRC process (an algorithm e.g., implemented in a digital signal processor (DSP) or simply a hardware processor) will aim to combine the two baseband signals $b1_1$ and $b1_2$ in a coherent fashion in order to maximize signal quality. The MRC process is able to multiply each complex baseband signal by a complex weight, so signal $b1_1$ is multiplied by $w1_1$ and $b1_2$ is multiplied by $w1_2$ and then perform a complex summation of the weighted complex baseband signals. Ideally the MRC process will essentially co-phase the two complex baseband signals prior to summation; this would be achieved by multiplying one of the complex baseband signals by a complex weight with a value which has a phase difference equal to and opposite to the phase difference between the two complex baseband signals. The output from the MRC process ($12_1$) results in an optimally combined complex baseband signal O1 which is transferred to higher abstraction layers within the base station for further processing for extraction of the information.

A base station clearly needs to communicate to and from multiple mobile terminals at the same time, and for this FIG. 4 depicts multiple logically independent MRC processes for k Uplink channels ($12_1$ to $12_k$), producing multiple outputs ($O_1$ to $O_k$) for higher layer processing within the base station. Each Uplink channel associated with different terminals may be communicating with the base station at the same time. Different down-conversion and MRC architectures are employed with different radio access schemes. For example, in GSM which employs Time Division Multiple Access (TDMA) then only a single MRC process is only required, changing its complex weights every time slot to process different uplink users. In WCDMA/UMTS which employs Code Division Multiple Access (CDMA) then the complex baseband signal emerging after down-conversion could be replicated multiple times and each copy then complex multiplied by a channelization code to extract the specific data associated with different terminals and then multiple, independent concurrent MRC processes are used, one for each terminal. In LTE which uses Frequency Division Multiple Access (FDMA) may require the down-conversion to be performed in two stages; a first stage resolving down to say a 10 MHz channel then a second down-conversion to resolve individual FDMA channels within the 10 MHz channel, or use of FFT processing techniques. The scope of the present invention is not to stipulate any specific down-conversion techniques or receive branch combining techniques, but to depict that logically there will be extraction of independent information associated with different terminals down to a complex baseband level.

The RF signals at VA and VB, and the corresponding down-converted complex baseband signals $b1_1$ and $b1_2$ are expected to be highly correlated in that they will fade together in temporal terms as a mobile terminal moves around, so the complex weights are expected to vary very slowly, and only changing in response to perhaps the mobile terminal moving around its environment such that its RF energy arrives at different angles, e.g., a mobile terminal moving away from a cell centre to cell edge radially. The above describes the scope of the present invention, where a MRC process is used to perform co-phasing of a pair of signals, whose phase difference is a function of the angle of arrival in elevation terms.

FIG. 4 depicts a generic M-branch MRC process. In practice, this may be a 4-branch MRC process to which the remaining two branches can be connected to the same antenna, and down-conversion arrangement for an orthogonal polarized antenna array, for example. This is not shown for clarity. The second antenna array is designed to create de-correlation to the first antenna array, and as such provide conventional receive diversity. In essence, FIG. 4 with a 4-branch MRC process would depict conventional 2-way de-correlated diversity combining plus adaptive elevation beamforming (tilting).

The Downlink channel is shown only as a single Downlink channel in FIG. 4, and therefore assuming two antenna arrays, this could represent up to two Downlink channels in a 2T4R base station configuration. The Downlink signal can also be transmitted from the same antenna assembly. In FIG. 4, the Downlink signal is duplexed onto one of the feed lines between base station and antenna assembly, and at the antenna assembly the duplexed signal is un-duplexed using duplexing filter 43, whereupon the Downlink signal is processed independently of the Uplink channel; a splitter 44 divides the Downlink signal into two branches, and one branch is connected to a variable phase shifter to create a phase difference between the two Downlink signals, which are then re-combined with the Uplink signals at duplexing filters 47A and 47B prior to connection to the VA and VB ports of the Beamforming Network. The Downlink signal will be processed by the beamforming network in accordance to the phase difference of the Downlink signal at the VA and VB ports, resulting in a coherent beam with variable beam tilt. An operation of FIG. 4 would adjust the Downlink tilt to be set at the minimum tilt angle of the Beamforming array, for example assume this is 2° tilt. The Uplink "per terminal" adaptive Beamforming range (adaptive because of the MRC process) may produce coherent beams for independent Uplink channels ranging from 2° to say 8°. In this case we are ensuring that minimum inter-cell Uplink interference occurs between cell sites. However, another operation might be to set the downlink tilt at say 5° tilt (middle of the Beamforming range of the Beamforming network). In this case the Uplink adaptive Beamforming range remains as 2° to 8° and as such allows Uplink channels to achieve an improved link budget at the cell edges. If different Beamforming ranges are required, then the phase shifters ($64_1$-$64_{1N}$) allow the Beamforming range to be moved by imposing a bulk phase slope across the array face of the antenna. For example, it would be possible to create a Beamforming range of 5° to 11°.

4.2 Embodiment 2

Figure 5:
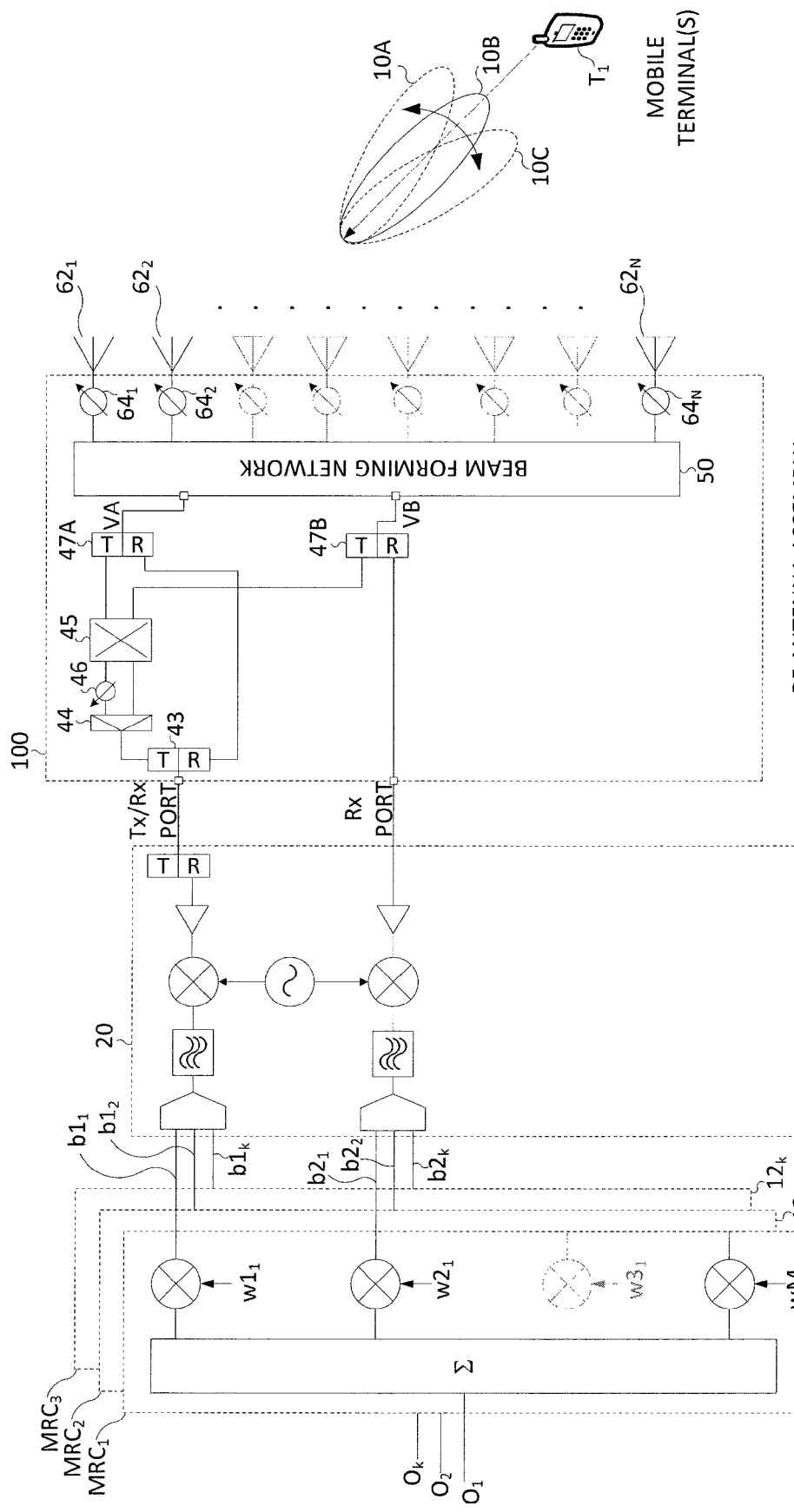
FIG. 5 depicts Uplink Elevation Beamforming using base station MRC receive combining process with a passive antenna array based on variable tilt in response to differential amplitude across VA & VB Ports.

FIG. 5 depicts Uplink Elevation Beamforming using base station MRC receive combining process with a passive antenna array based on variable tilt in response to differential amplitude across VA & VB Ports. A second embodiment of the current invention is illustrated in FIG. 5, and is virtually identical to the first embodiment but using an antenna assembly based upon an adaptive beamforming network (50) designed for processing differential amplitude signals at the ports of the beamforming network (VA and VB). Such a beamforming network (50) suitable for operation includes that based upon U.S. Pat. No. 6,864,837B. Assuming an Uplink channel, the RF energy arriving at the antenna array is processed via the beamforming Network (50) which results in signals at the ports VA and VB of the beamforming Network. The signals, associated with terminal $T_1$ at VA and VB will be substantially of equal phase, but will have an amplitude differential; the phase difference being a function of the angle of arrival in elevation, assuming that the angle of arrival falls within the valid Beamforming range of the beamforming network. The signals at VA and VB are connected to Duplexing filters, 47A and 47B, respectively, which are designed to accommodate a Downlink signal for the antenna array, which will be discussed later in this embodiment.

Considering only the Uplink signals from VA and VB, these are essentially passed directly to the base station; the first processing stage of a base station being the RF to Baseband Down-conversion stages (20), and similar to that already described for the first embodiment. The two differential amplitude Uplink signals are down-converted to digital complex baseband; signal VA emerges as $b1_1$ at complex baseband and signal VB emerges as $b2_1$ at complex baseband. Complex baseband signal $b1_1$ for example will consist of a real and imaginary baseband signal components. It can be shown that the RF amplitude difference between VA and VB ports will emerge as a baseband amplitude difference between $b1_1$ and $b1_2$, according to digital Beamforming theory previously discussed. The two complex baseband signals are then processed by a Maximal Ratio Combining (MRC) or other similar receive combining process (121). The MRC process (e.g., an algorithm deployed in a DSP) will aim to combine the two baseband signals $b1_1$ and $b1_2$ in such a manner as to maximize signal quality. The MRC process is able to multiply each complex baseband signal by a complex weight, so signal $b1_1$ is multiplied by $w1_1$ and $b1_2$ is multiplied by $w1_2$ and then perform a complex summation of the weighted complex baseband signals. Ideally the MRC process will essentially multiply each complex baseband signal according to the S/N of each signal prior to summation. There ought to be no phase difference between VA and VB, and hence no phase difference at complex baseband between $b1_1$ and $b1_2$ and as such no co-phasing would be necessary. Therefore, this embodiment might be more suitable for MRC processing based on post-detection MRC architectures since phase information would be lost in post-detection schemes.

The RF signals at VA and VB, and the corresponding down-converted complex baseband signals $b1_1$ and $b1_2$ are expected to be highly correlated in that they will fade together in temporal terms as a mobile terminal moves around, so the complex weights are expected to vary very slowly, and only changing in response to perhaps the mobile terminal moving around its environment such that its RF energy arrives at different angles, e.g., a mobile terminal moving away from a cell centre to cell edge radially. The above describes the scope of the present invention, where a simple MRC process is used to perform co-weighting of a pair of signals, whose amplitude difference is a function of the angle of arrival in elevation terms.

FIG. 5 depicts a generic M-branch MRC process. In practice, this may be a 4-branch MRC process to which the remaining two branches can be connected to the same antenna, and down-conversion arrangement for an orthogonal polarized antenna array, for example. This is not shown for clarity. The second antenna array is designed to create de-correlation to the first antenna array, and as such provide conventional receive diversity. In essence, FIG. 5 with a 4-branch MRC process would depict conventional 2-way de-correlated diversity combining plus adaptive elevation beamforming (tilting).

The Downlink channel is shown only as a single Downlink channel in FIG. 5, and therefore assuming two antenna arrays, this could represent up to two Downlink channels in a 1T4R or 2T4R base station configuration. The Downlink signal can also be transmitted from the same antenna assembly. In FIG. 5, the Downlink signal is duplexed onto one of the feed lines between base station and antenna assembly, and at the antenna assembly the duplexed signal is un-duplexed using duplexing filter 43, whereupon the Downlink signal is processed independently of the Uplink channel; a splitter (44) divides the Downlink signal into two branches, and one branch is connected to a variable phase shifter (46) to create a phase difference between the two Downlink signal branches, which are then connected to the input ports of a 180° Hybrid Coupler (45); the outputs of the Hybrid coupler (45) being re-combined with the Uplink signals at duplexing filters 47A and 47B prior to connection to the VA and VB ports of the Beamforming Network (50). The Hybrid Coupler (45) converts phase difference to a complimentary power difference, to which the Beamformer network (50) can create different beams (tilts). The Downlink signal will be processed by the Beamforming network in accordance to the amplitude difference (created by the phase difference imposed by phase shifter (46)) of the Downlink signals at the VA and VB ports, resulting in a coherent beam with variable beam tilt. An operation of FIG. 5 would adjust the Downlink tilt to be set at the minimum tilt angle of the beamforming array, for example assume this is 2° tilt. The Uplink "per terminal" adaptive Beamforming range (adaptive because of the MRC process) may produce coherent beams for independent Uplink channels ranging from 2° to say 8°. In this case we are ensuring that minimum inter-cell Uplink interference occurs between cell sites. However, another operation might be to set the downlink tilt at say 5° tilt (middle of the beamforming range of the Beamforming network). In this case the Uplink adaptive beamforming range remains as 2° to 8° and as such allows Uplink channels to achieve an improved link budget at the cell edges. If different beamforming ranges are required, then the phase shifters ($64_1$-$64_{1N}$) allow the beamforming range to be moved by imposing a bulk phase slope across the array face of the antenna. For example, it would be possible to create a beamforming range of 5° to 11°.

4.3 Embodiment 3

Figure 6:
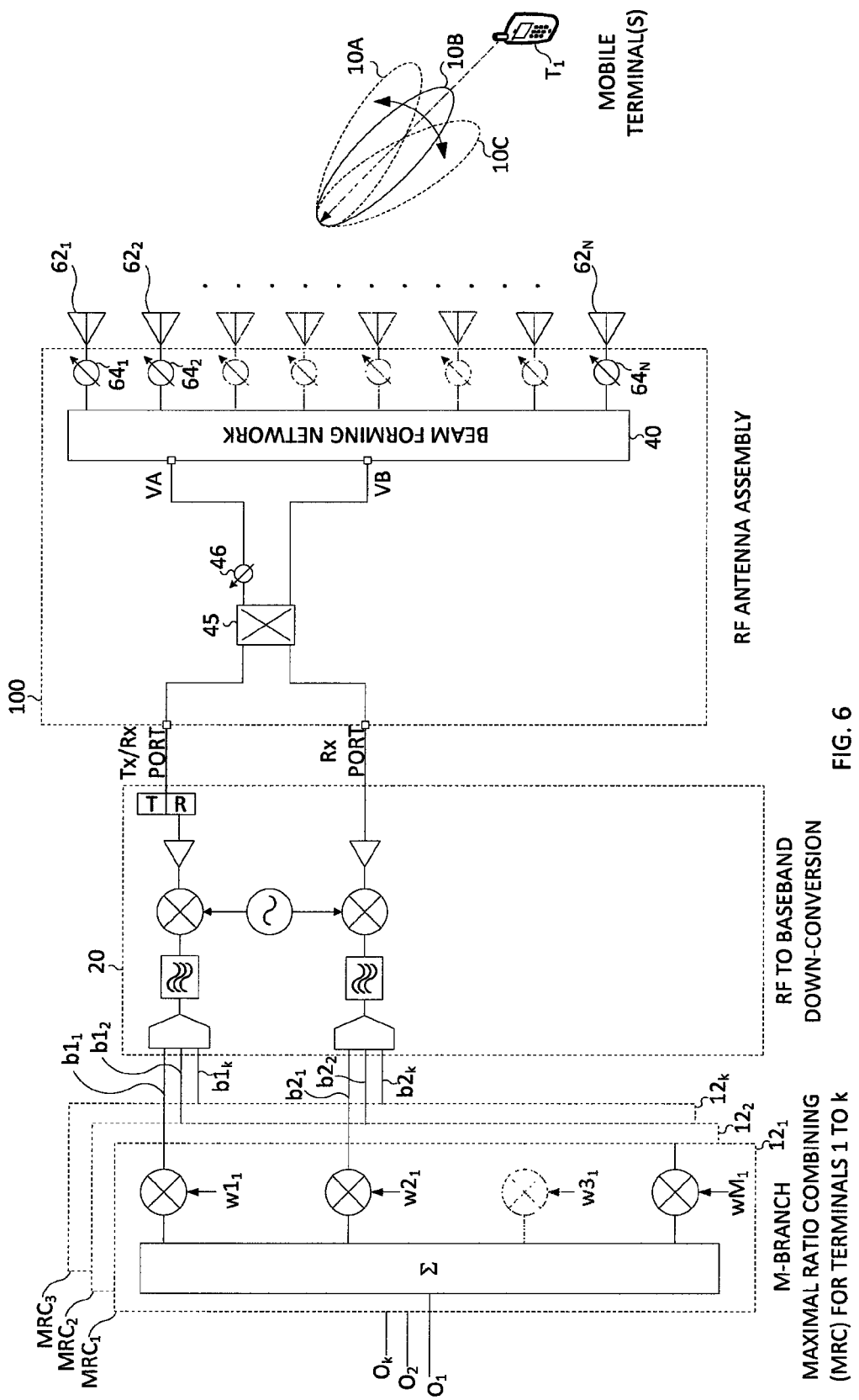
FIG. 6 depicts Uplink Elevation Beamforming using 2T4R base station with MRC receive combining process with a passive antenna array based on variable tilt in response to differential phase across VA & VB Ports.

FIG. 6 depicts Uplink Elevation Beamforming using 2T4R base station with MRC receive combining process with a passive antenna array based on variable tilt in response to differential phase across VA & VB Ports. A third embodiment of the current invention is illustrated in FIG. 6, and is virtually identical to the first embodiment using an antenna assembly based upon an adaptive beamforming network (40) designed for processing differentially phased signals at the ports of the beamforming network (VA and VB). Such a beamforming network (40) suitable for operation includes that based upon U.S. Pat. No. 7,450,066, U.S. Pat. No. 7,400,296, or U.S. Pat. No. 7,420,507. The difference between the first and third embodiments is simply how the Downlink signal is applied to the Beamforming Network (40). In FIG. 6, the base station feed line which carries Downlink and Uplink channels is applied to one input port of an 180° Hybrid coupler (45). This splits the Downlink signal into two equal and in-phase power branches at the outputs of the Hybrid coupler (45). One output from the Hybrid Coupler is connected to a variable RF phase shifter (46) to impose a phase delay. This results in a differentially phased Downlink signal which is applied to the VA and VB ports of the beamforming network (40). However, the Uplink signal is processed slightly differently to the first embodiment, because of the presence of the Hybrid Coupler (45). As per the first embodiment, assuming an Uplink channel, the RF energy arriving at the antenna array is processed via the beamforming Network (40) which results in signals at the ports VA and VB of the beamforming Network. The signals, associated with terminal $T_1$ at VA and VB will be substantially of equal amplitude, but will have a phase differential; the phase difference being a function of the angle of arrival in elevation, assuming that the angle of arrival falls within the valid beamforming range of the beamforming network. Considering the Uplink signals at VA and VB, these are connected to the Hybrid Coupler (45) ports 452 and 454 via RF phase shifter (46), which will convert phase difference between the signal at ports 452 and 454 into a signal pair at ports 451 and 453 as a complimentary power difference, the power difference being a function of the phase difference. Therefore the base station RF to Baseband down-conversion and MRC processing treat the Uplink signal as a complimentary or a differential amplitude pair, as per the second embodiment. By converting a differentially phased Uplink signal at ports VA and VB into differential amplitude of the Uplink signal, the MRC process can be based on pre or post detection implementations. A further advantage of this embodiment over the first embodiment is that duplexing filters can be removed being replaced by a simple Hybrid Coupler.

4.4 Embodiment 4

Figure 7:
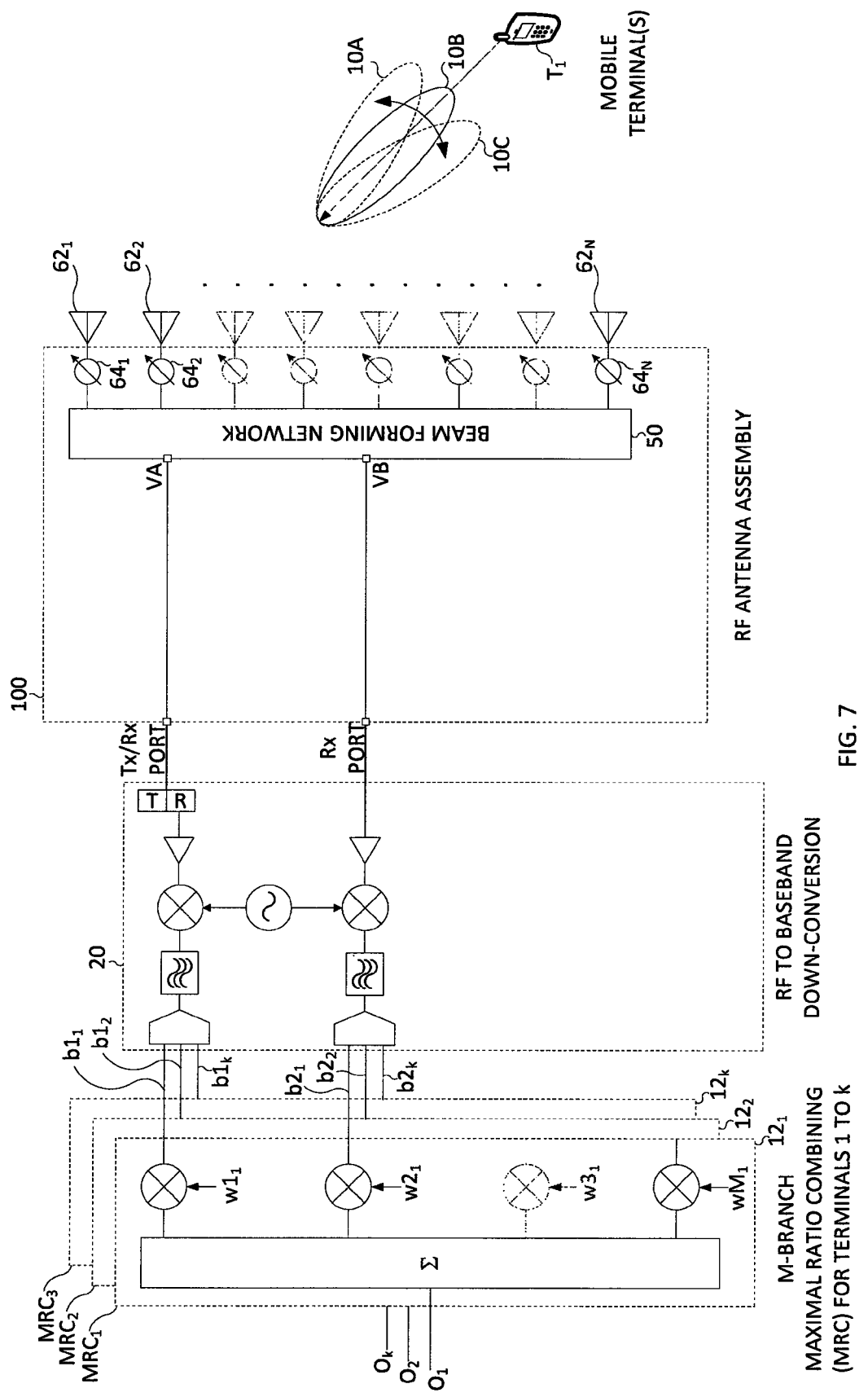
FIG. 7 depicts Uplink Elevation Beamforming using 2T4R base station with MRC receive combining process with a passive antenna array based on variable tilt in response to differential amplitude across VA & VB Ports.

FIG. 7 depicts Uplink Elevation Beamforming using 2T4R base station with MRC receive combining process with a passive antenna array based on variable tilt in response to differential amplitude across VA & VB Ports. A fourth embodiment of the current invention is illustrated in FIG. 7, and is virtually identical to the second embodiment using an antenna assembly based upon an adaptive beamforming network (50) designed for processing differential amplitude signals at the ports of the beamforming network (VA and VB). Such a beamforming network (50) suitable for operation includes that based upon U.S. Pat. No. 6,864,837B. The difference between the second and fourth embodiments is simply how the Downlink signal is applied to the Beamforming Network (50). In FIG. 7, the base station feed line which carries Downlink and Uplink channels is applied directly to one port of the beamforming network, in this case port VA.

In this fourth embodiment, the entire Downlink signal is applied to port VA and no Downlink power is applied to port VB. This results in a fixed Downlink beam at minimum tilt or Beamforming range producing a beam 10A to carry the Downlink channel. The Uplink channel is processed exactly the same as the second embodiment, where the Uplink signal from a terminal results in differential power at ports VA and VB, which are directly connected to the base station, down-converted to complex baseband, and processed in the MRC receiver combining process. Again, an advantage of this embodiment is that a post detection MRC scheme can also be used, since only amplitude difference is processed (not phase difference) with a post detection MRC scheme. The key advantage of this fourth embodiment is that it does not require any duplexing filters or additional Hybrid Couplers, but the disadvantage being that the Downlink channel cannot be varied within the range of the beamforming tilt range.

It would however be possible to derive many further embodiments using the building blocks of Hybrid Couplers, an RE Phase Shifter, Duplexing filters, etc. to arrive at similar arrangements. For example, the schematic in FIG. 7 could include a Hybrid Coupler and phase shifter applied between the base station and the Beamforming Network (similar to that shown in embodiment 3). In this case it would be possible to vary Downlink beam tilt, but would require pre-detection MRC to affect Uplink channel Beamforming. Additionally, the above embodiments have assumed that the access technology is based upon Frequency Division Duplexing (FDD). To those versed in the art it is in the scope of the current invention that the current invention can also be applied in Time Division Duplex (TDD) systems arriving at numerous possible configurations.

4.5 Embodiment 5

Figure 8:
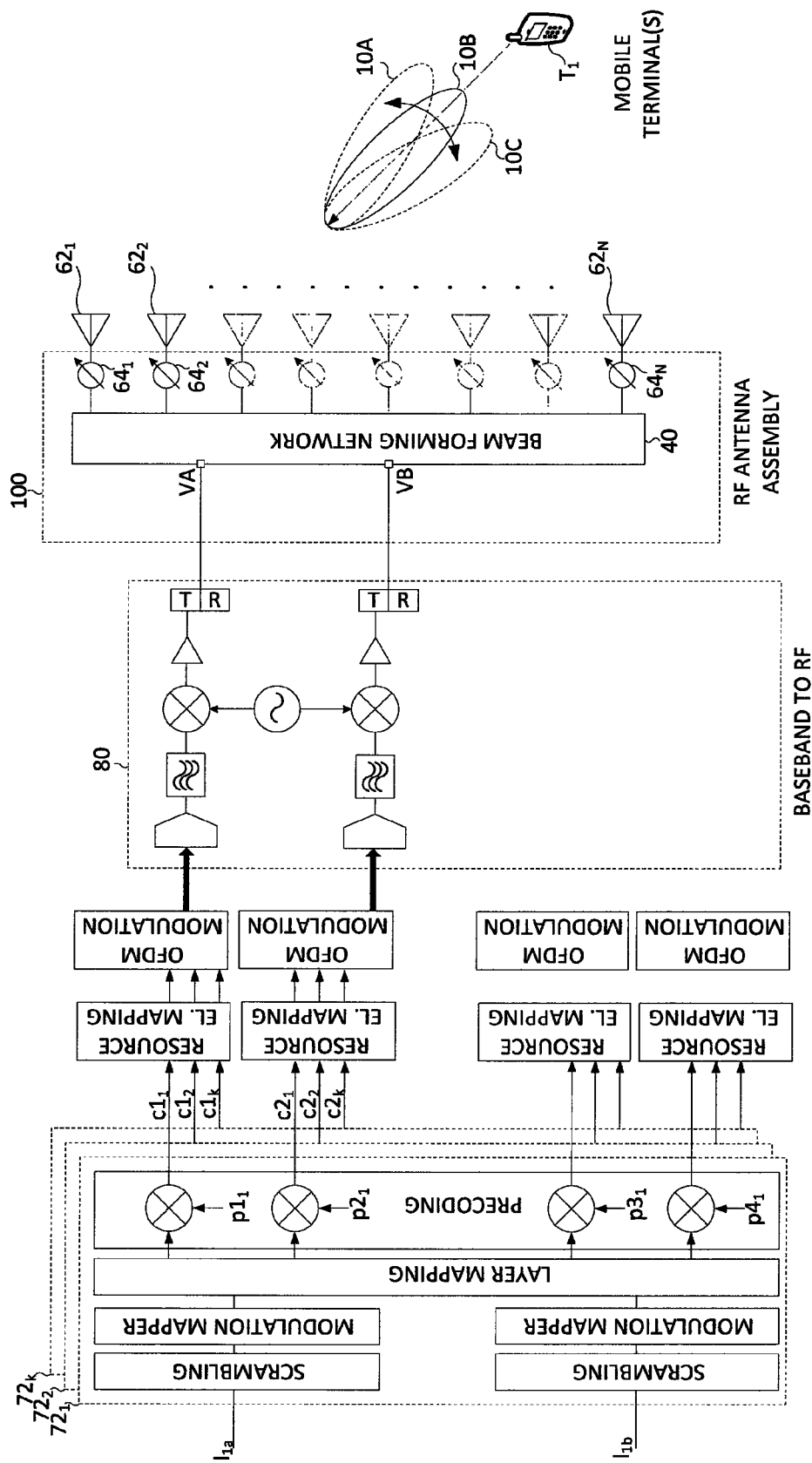
FIG. 8 depicts Downlink Elevation Beamforming using 4T4R base station (only 2 of 4 ports shown) connected to a passive antenna array based on variable tilt in response to differential phase across VA & VB Ports.

FIG. 8: Downlink Elevation Beamforming using 4T4R base station (only 2 of 4 ports shown) connected to a passive antenna array based on variable tilt in response to differential phase across VA & VB Ports. A fifth and final embodiment of the current invention is illustrated in FIG. 8. This embodiment uses an antenna assembly based upon an adaptive Beamforming network (40) designed for processing differential phased signals at the ports of the Beamforming network (VA and VB). Such a Beamforming network (40) suitable for operation includes those based upon U.S. Pat. No. 7,450,066, U.S. Pat. No. 7,400,296, or U.S. Pat. No. 7,420,507. However, this embodiment includes both Uplink and Downlink channel adaptive Beamforming in the elevation plane. For clarity we do not show or describe the Uplink Beamforming process as this can be considered identical or similar to that already described for embodiments one and three. In FIG. 8, we show the Downlink channel processing stages for an LTE base station. An LTE base station might be more appropriate than a GSM or UMTS base station when considering Downlink Beamforming, since 3GPP LTE specifications include user specific Downlink reference/pilot symbols which can be also applied through a beamforming process and hence for the user terminal to make accurate radio channel estimation and equalization. Furthermore, 3GPP LTE Release 9 specifications include user specific pilot symbols on multiple layers to allow for example 2×2 spatial multiplexing MIMO and 2-branch Transmit Diversity with adaptive coherent beamforming; later releases of LTE specifications promise additional spatial multiplexing layers and higher order Tx diversity to be combined with coherent adaptive Beamforming.

FIG. 8 depicts a high-level view of the Downlink channel processing for a 3GPP LTE Release 9 base station operating in FDD operation connected to an antenna array (40) based on differential phase processing of the Beamforming network ports. In LTE there are numerous multiple antenna techniques, configurations and Transmission Modes some of which is discussed in the introduction section including Spatial Multiplexing MIMO, Transmit Diversity and Spatial Beamforming. The instance shown in FIG. 8 is where two input lines or codewords (I1$a$ and I1$b$), representing data carried on the primary data channel in LTE, the Physical Downlink Shared Channel (PDSCH) which is derived from higher abstraction layers of the LTE protocol, are mapped to one terminal (T1). Each codeword is processed by a process of scrambling (to randomize data) and symbol modulation (e.g., QPSK, 16QAM or 64QAM modulation applied depending upon the instantaneous Downlink channel conditions reported back by the Terminal $T_1$ on the Uplink—not shown). The scrambled and modulated codewords are then processed through a Layer Mapping stage, and is showing that processed (scrambled and symbol modulated) codeword $I_{1a}$ is mapped to two Layers; the same mapping applies for processing of codeword $I_{1b}$. In this embodiment, each processed codeword is split into two layers, which are then pre-coded by applying complex weights; $p1_1$ and $p2_1$ are the complex weights applied to each of the two branches of the processed codeword $I_{1a}$, resulting in complex baseband signals $c1_1$ and $c2_1$; similarly $p3_1$ and $p4_1$ are the complex weights applied to each of the two branches of the processed codeword $I_{1b}$, resulting in $c3_1$ and $c4_1$. The pre-coding stage in this case is designed to achieve, through application of a weight vector, adaptive coherent 2-branch transmit Beamforming for each processed codeword, and independent Beamforming for each processed codeword. The resulting two pre-coded signals, associated with each codeword are then mapped to LTE Physical Resources, e.g., frequency and time resources (broadly an allocation stage) under the control of traffic management scheduling algorithms (not shown), and subsequently to OFDM Modulation (broadly a modulation stage for modulating the pre-coded signals into modulated signals), which in turn is up-converted from complex OFDM modulated baseband to RF, and finally power amplified suitable for transmission (80) (broadly a baseband to RF up-conversion stage up-converting the modulated signals into RF signals). The two power amplified RF signals, associated with codeword $I_{1a}$ are then connected to the two ports (VA and VB) of the Antenna Beamforming Network (40) which in turn drives the array of antenna elements ($62_1$-$62_N$). In this embodiment, adaptive elevation plane spatial beamforming for Downlink data for terminal $T_1$ carried on the PDSCH is achieved by imposing phase a difference between complex baseband signals $c1_1$ and $c2_1$. The resulting elevation beam tilt is a function of the phase shift, and achieved by the pre-coding stage. In FIG. 8, the Downlink Scrambling, Modulation, Pre-Coding and OFDM Multiplexing processing of the PDSCH is shown for data associated with one terminal, T1; this processing is shown collectively within $72_1$ (broadly described as a precoding stage). Broadly, the precoding stage is for mapping of baseband data symbols associated with a mobile terminal into two baseband signal branches and pre-coding the branches via a multiplication of the signal branches with complex pre-coding weights to impart a phase difference between the two signal branches for generating pre-coded signals. However, as LTE is a multiple access system there will be multiple concurrent similar Scrambling, Modulation, Pre-Coding and OFDM Multiplexing processes associated with PDSCH data associated for other terminals which are denoted as $72_2$ to $72_k$ for k parallel processes. These other data channels will be mapped to different OFDM sub-tones under the control of the Downlink traffic scheduling algorithms. Different and independent data associated with other terminals can be pre-coded independently and hence result in independent beams in the elevation plane. Non PDSCH channels such as common physical channels including the cell broadcast channel are designed to be transmitted across the entire cell, and as such do not need to be (and are not adaptively Beamformed) via the pre-coding stage. Instead, these non-adaptive Beamformed data channels can be split across the two transmission lines with a fixed phase shift, or semi-static phase shift resulting in a fixed/static beam tilt via the antenna assembly; the phase shift for common channels can of course be changed periodically to effectively deliver a conventional variable electrical tilt function.

The final stages of processing of signals associated with PDSCH codeword $I_{1b}$ are not shown for clarity, but would undergo similar processing into a second antenna Beamforming network, which might associated with an antenna array with an orthogonal polarization to the first antenna array ($62_1$-$62_N$), for example.

The pre-coding vector is expected to change very slowly as the intention is to focus a coherent beam (tilt) toward the terminal $T_1$ for the Downlink channel, and the pre-coding vector would be expected to change in response to significant movement of travel of the terminal $T_1$ through its radio channel and environment.

It would however be possible to derive many further embodiments using the building blocks of the aforementioned embodiments to arrive at similar arrangements to achieve downlink channel elevation plane spatial beamforming. For example, the schematic in FIG. 8 could use an RF Antenna Assembly using a beamforming network designed to vary a beam tilt in response to differential amplitude (rather than differential phase) at its ports, where the LIE Downlink pre-coding stages would in this case need to apply complex weights to information symbols which would create differential amplitude in order to effect variable beam tilt in elevation. Additionally a Hybrid Coupler and phase shifter could be applied between the base station and the Beamforming Network (40) ports (i.e., similar to that described in embodiment 3) in FIG. 8; in this case a common channel such as the broadcast channel could be present on only one Tx/Rx line from the base station; the Hybrid combiner and phase shifter performing a splitting and phase shift function so that the broadcast channel information can be applied across the VA and VB ports and deliver a particular beam tilt for the common channels. In this case, information to be adaptively beamformed in elevation, e.g., data carried on the PDSCH would need to be pre-coded to create differential amplitude, which would be converted to differential phase at the outputs of the Hybrid combiner in order to be able to adaptively vary beam tilt. Additionally, the above embodiments have assumed that the access technology is based upon Frequency Division Duplexing (FDD). To those versed in the art the scope of the current invention can also be applied in Time Division Duplex (TDD) systems arriving at numerous possible configurations too.

It should be noted that various stages of the present invention can be implemented via a hardware processor and a non-transitory memory (broadly a computer readable medium). For example, a hardware system (not shown) may comprise a processor element (e.g., a CPU), and a memory for performing the various functions as described above.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions, stages and/or operations of the above disclosed methods.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A base station system, comprising:
a passive radio frequency (RF) antenna assembly comprising a single beamforming network having two ports, for creating a spatially coherent main beam with a variable elevation plane beam tilt in response to differentially phased signals or differentially amplitude weighted signals across the two ports, wherein the passive RF antenna assembly is for use in a receive mode and in a transmit mode, wherein the passive RF antenna assembly comprises a plurality of antenna elements, wherein the plurality of antenna elements comprises at least five antenna elements, wherein the passive RF antenna assembly further comprises a transmit/receive duplexed port and a receive only port, wherein the transmit/receive duplexed port is connected to a first input port of a hybrid combiner and the receive only port is coupled to a second input port of the hybrid combiner, wherein outputs of the hybrid combiner are connected to the two ports of the single beamforming network, wherein one of the outputs is applied to a variable phase shifter to permit a variable elevation tilt of a downlink transmit signal;
a RF to baseband down conversion stage coupled to the passive RF antenna assembly, for processing the differentially phased signals or differentially amplitude weighted signals into baseband signals, wherein the differentially phased signals or differentially amplitude weighted signals are correlated signals; and
a receiver combining stage for performing a vector summation on the baseband signals.

2. The base station system of claim 1, wherein performing the vector summation comprises at least one of:
performing a maximal ratio combining process; or
performing an interference rejection combining process.

3. The base station system of claim 2, wherein the maximal ratio combining process comprises a post-detection maximal ratio combining process.

4. The base station system of claim 2, wherein the maximal ratio combining process comprises a pre-detection maximal ratio combining process.

5. The base station system of claim 1, wherein the differentially phased signals or differentially amplitude weighted signals are associated with a plurality of mobile terminals of a cellular network.

6. The base station system of claim 5, wherein the differentially phased signals or differentially amplitude weighted signals associated with the plurality of mobile terminals are processed as multiple parallel receive diversity combining processes.

7. The base station system of claim 1, further comprising:
a second passive RF antenna assembly which is an orthogonal polarization to the passive RF antenna assembly and wherein the receiver combining stage is for performing a vector summation on four branches of the baseband signals.

8. The base station system of claim 1, further comprising:
a second passive RF antenna assembly which is an orthogonal polarization to the passive RF antenna assembly and wherein the receiver combining stage is for performing a vector summation on more than four branches of the baseband signals.

9. A method, comprising:
creating a spatially coherent main beam with a variable elevation plane beam tilt in response to differentially phased signals or differentially amplitude weighted signals across two ports of a single beamforming network of a passive radio frequency (RF) antenna assembly, wherein the passive RF antenna assembly is for use in a receive mode and in a transmit mode, wherein the passive RF antenna assembly comprises a plurality of antenna elements, wherein the plurality of antenna elements comprises at least five antenna elements, wherein the passive RF antenna assembly further comprises a transmit/receive duplexed port and a receive only port, wherein the transmit/receive duplexed port is connected to a first input port of a hybrid combiner and the receive only port is coupled to a second input port of the hybrid combiner, wherein outputs of the hybrid combiner are connected to the two ports of the single beamforming network, wherein one of the outputs is applied to a variable phase shifter to permit a variable elevation tilt of a downlink transmit signal;
processing the differentially phased signals or differentially amplitude weighted signals into baseband signals via a RF to baseband down conversion stage coupled to the passive RF antenna assembly, wherein the differentially phased signals or differentially amplitude weighted signals are correlated signals; and
performing a vector summation on the baseband signals via a receiver combining stage.

10. The method of claim 9, wherein the performing the vector summation comprises at least one of:
performing a maximal ratio combining process; or
performing an interference rejection combining process.

11. The method of claim 10, wherein the maximal ratio combining process comprises a post-detection maximal ratio combining process.

12. The method of claim 10, wherein the maximal ratio combining process comprises a pre-detection maximal ratio combining process.

13. The method of claim 9, wherein the differentially phased signals or differentially amplitude weighted signals are associated with a plurality of mobile terminals of a cellular network.

14. The method of claim 13, wherein the differentially phased signals or differentially amplitude weighted signals associated with the plurality of mobile terminals are processed as multiple parallel receive diversity combining processes.

15. A base station system, comprising:
a passive radio frequency (RF) antenna assembly comprising a single beamforming network having two ports, for creating a spatially coherent main beam with a variable elevation plane beam tilt in response to differentially phased signals or differentially amplitude weighted signals across the two ports, wherein the passive RF antenna assembly is for use in a receive mode and in a transmit mode, wherein the passive RF antenna assembly comprises a plurality of antenna elements, wherein the plurality of antenna elements comprises at least five antenna elements, wherein the passive RF antenna assembly further comprises a transmit/receive duplexed port and a receive only port, wherein the transmit/receive duplexed port is connected to a duplex filter for performing a un-duplexing action to provide a transmit signal on a transmit signal path and a receive signal on a receive signal path, wherein the transmit signal path is connected to an RF splitter for creating two transmit signal branches whereupon an RF phase shifter is applied to one of the two transmit signal branches, wherein the two transmit signal branches create a differential phased signal pair which is re-duplexed using a pair of duplexing filters, wherein outputs of the duplexing filters are connected to the two ports of the single beamforming network;
a RF to baseband down conversion stage coupled to the passive RF antenna assembly, for processing the differentially phased signals or differentially amplitude weighted signals into baseband signals, wherein the differentially phased signals or differentially amplitude weighted signals are correlated signals; and
a receiver combining stage for performing a vector summation on the baseband signals.

16. A base station system, comprising:
a passive radio frequency (RF) antenna assembly comprising a single beamforming network having two ports, for creating a spatially coherent main beam with a variable elevation plane beam tilt in response to differentially phased signals or differentially amplitude weighted signals across the two ports, wherein the passive RF antenna assembly is for use in a receive mode and in a transmit mode, wherein the passive RF antenna assembly comprises a plurality of antenna elements, wherein the plurality of antenna elements comprises at least five antenna elements, wherein the passive RF antenna assembly further comprises a transmit/receive duplexed port and a receive only port, wherein the transmit/receive duplexed port is connected to a duplex filter for performing a un-duplexing action to provide a transmit signal on a transmit signal path and a receive signal on a receive signal path, wherein the transmit signal path is connected to an RF splitter for creating two transmit signal branches whereupon an RF phase shifter is applied to one of the two transmit signal branches, wherein the two transmit signal branches create a differential phased signal pair which is converted by a hybrid combiner to a differential amplitude signal pair which is then re-duplexed using a pair of duplexing filters, wherein outputs of the duplexing filters are connected to the two ports of the single beamforming network;
a RF to baseband down conversion stage coupled to the passive RF antenna assembly, for processing the differentially phased signals or differentially amplitude weighted signals into baseband signals, wherein the differentially phased signals or differentially amplitude weighted signals are correlated signals; and a receiver combining stage for performing a vector summation on the baseband signals.

17. A method, comprising:

creating a spatially coherent main beam with a variable elevation plane beam tilt in response to differentially phased signals or differentially amplitude weighted signals across two ports of a single beamforming network of a passive radio frequency (RF) antenna assembly, wherein the passive RF antenna assembly is for use in a receive mode and in a transmit mode, wherein the passive RF antenna assembly comprises a plurality of antenna elements, wherein the plurality of antenna elements comprises at least five antenna elements, wherein the passive RF antenna assembly further comprises a transmit/receive duplexed port and a receive only port, wherein the transmit/receive duplexed port is connected to a duplex filter for performing a un-duplexing action to provide a transmit signal on a transmit signal path and a receive signal on a receive signal path, wherein the transmit signal path is connected to an RF splitter for creating two transmit signal branches whereupon an RF phase shifter is applied to one of the two transmit signal branches, wherein the two transmit signal branches create a differential phased signal pair which is re-duplexed using a pair of duplexing filters, wherein outputs of the duplexing filters are connected to the two ports of the single beamforming network;

processing the differentially phased signals or differentially amplitude weighted signals into baseband signals via a RF to baseband down conversion stage coupled to the passive RF antenna assembly, wherein the differentially phased signals or differentially amplitude weighted signals are correlated signals; and performing a vector summation on the baseband signals via a receiver combining stage.

* * * * *